United States Patent [19]

Pascouet

[11] Patent Number: 4,735,281

[45] Date of Patent: Apr. 5, 1988

[54] INTERNAL BUBBLE-SUPPRESSION METHOD AND APPARATUS

[76] Inventor: Adrien P. Pascouet, 12014 Chatam La., Houston, Tex. 77024

[21] Appl. No.: 703,302

[22] Filed: Feb. 20, 1985

[51] Int. Cl.$^4$ ............................................. G01V 1/387
[52] U.S. Cl. ................................... 181/115; 181/118; 181/120; 367/144
[58] Field of Search ............... 181/110, 113, 115, 118, 181/120; 367/144

[56] References Cited

U.S. PATENT DOCUMENTS

| | | | |
|---|---|---|---|
| 3,371,740 | 3/1968 | Loper | 181/115 |
| 3,454,127 | 7/1969 | Malme et al. | 181/115 |
| 3,601,216 | 8/1971 | Mott-Smith | 181/115 |
| 3,653,460 | 4/1972 | Chelminski | 181/120 |
| 3,744,018 | 7/1973 | Wood, III | 181/115 |
| 3,746,123 | 7/1973 | Huffhines | 181/115 |
| 3,804,194 | 4/1974 | Umphenour | 181/115 |

*Primary Examiner*—Ted L. Parr
*Attorney, Agent, or Firm*—Michael O. Sutton

[57] ABSTRACT

The novel method substantially reduces the pressure pulse generated by an implosion of a cavity within a body of water by aborting the implosion. The abortion of the implosion is produced by generating within the cavity an explosion at the instant that this cavity attains its maximum volume.

The method can also be used to generate within a body of water an impulsive acoustic signal by generating a first explosion within the body of water to produce therein a powerful pressure pulse and a cavity of very low pressure, and then generating a second explosion within the cavity so as to establish hydrostatic pressure inside the cavity while the volume of the cavity remains within a few percent of its maximum volume.

The apparatus comprises first and second explosive generators which consecutively create two explosions within the body of water: a first explosion which produces within the body of water a powerful acoustic pulse and an expanding cavity of very low pressure, and a second explosion which establishes hydrostatic pressure within the cavity while the volume of the cavity remains within a few percent of its maximum volume, thereby substantially reducing the ensuing secondary pressure pulses.

31 Claims, 13 Drawing Sheets

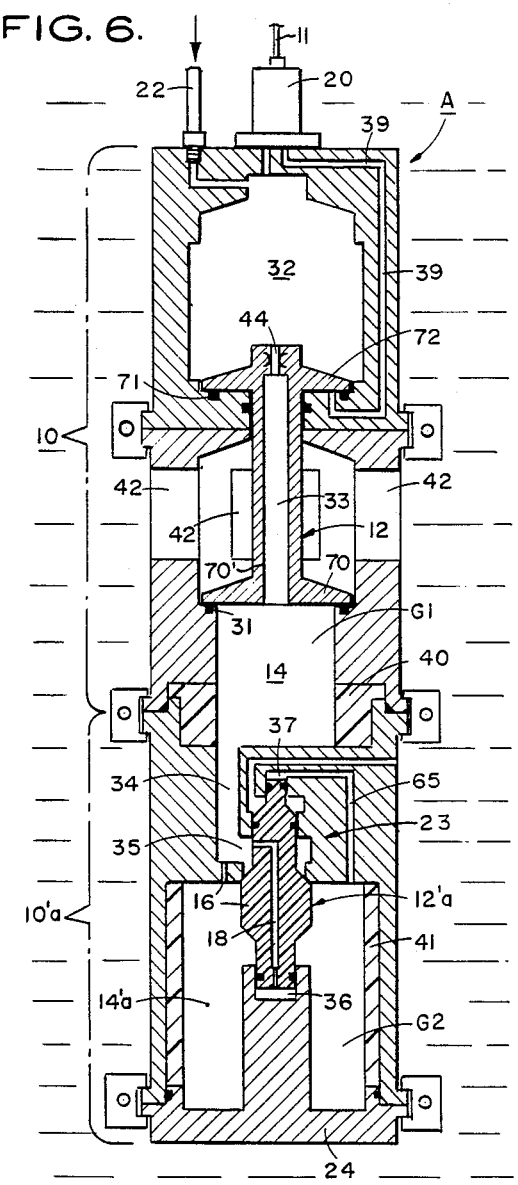
FIG. 6.
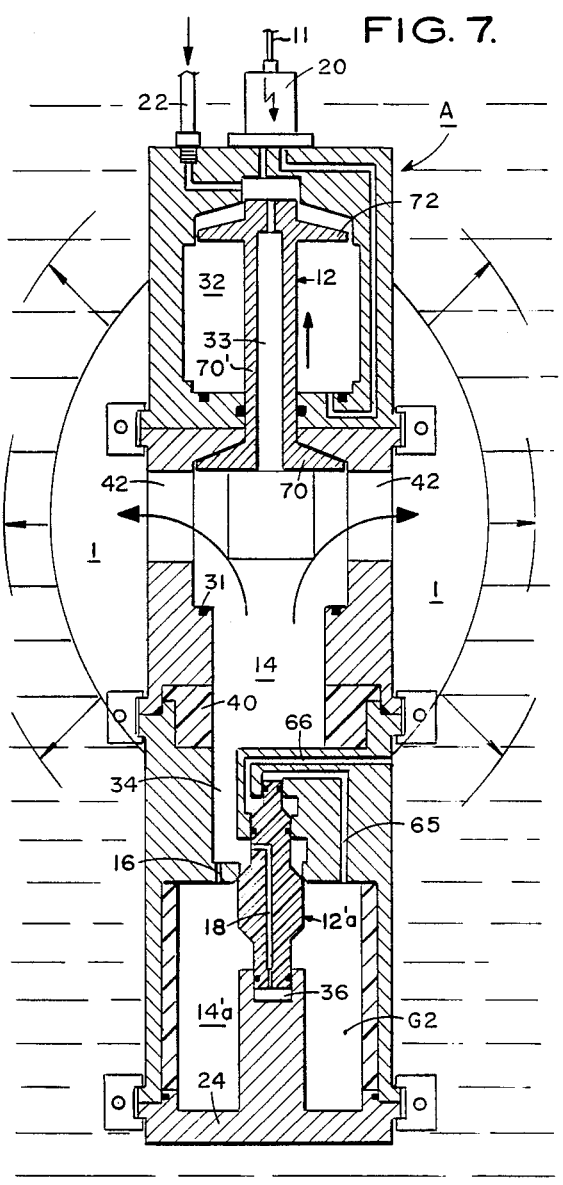
FIG. 7.
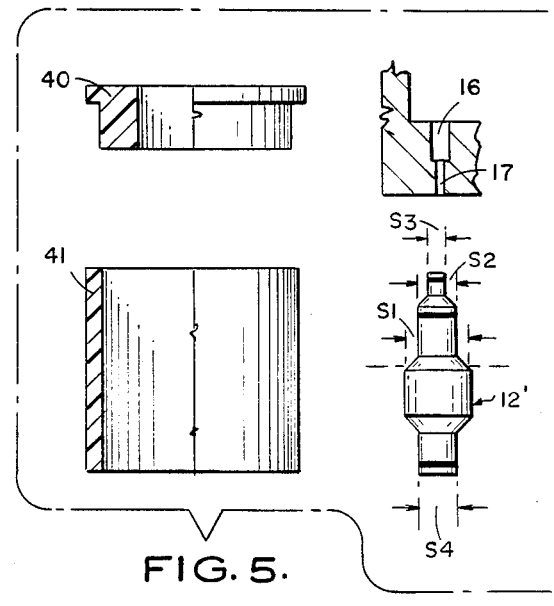
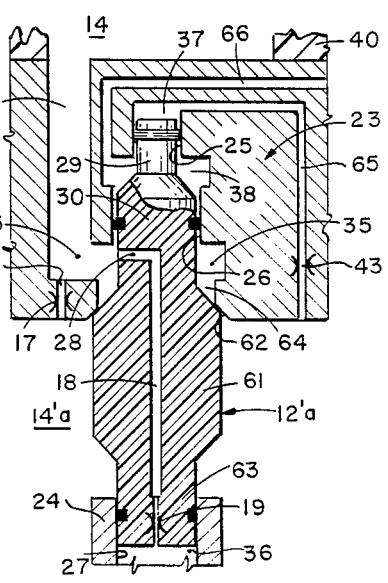
FIG. 5.

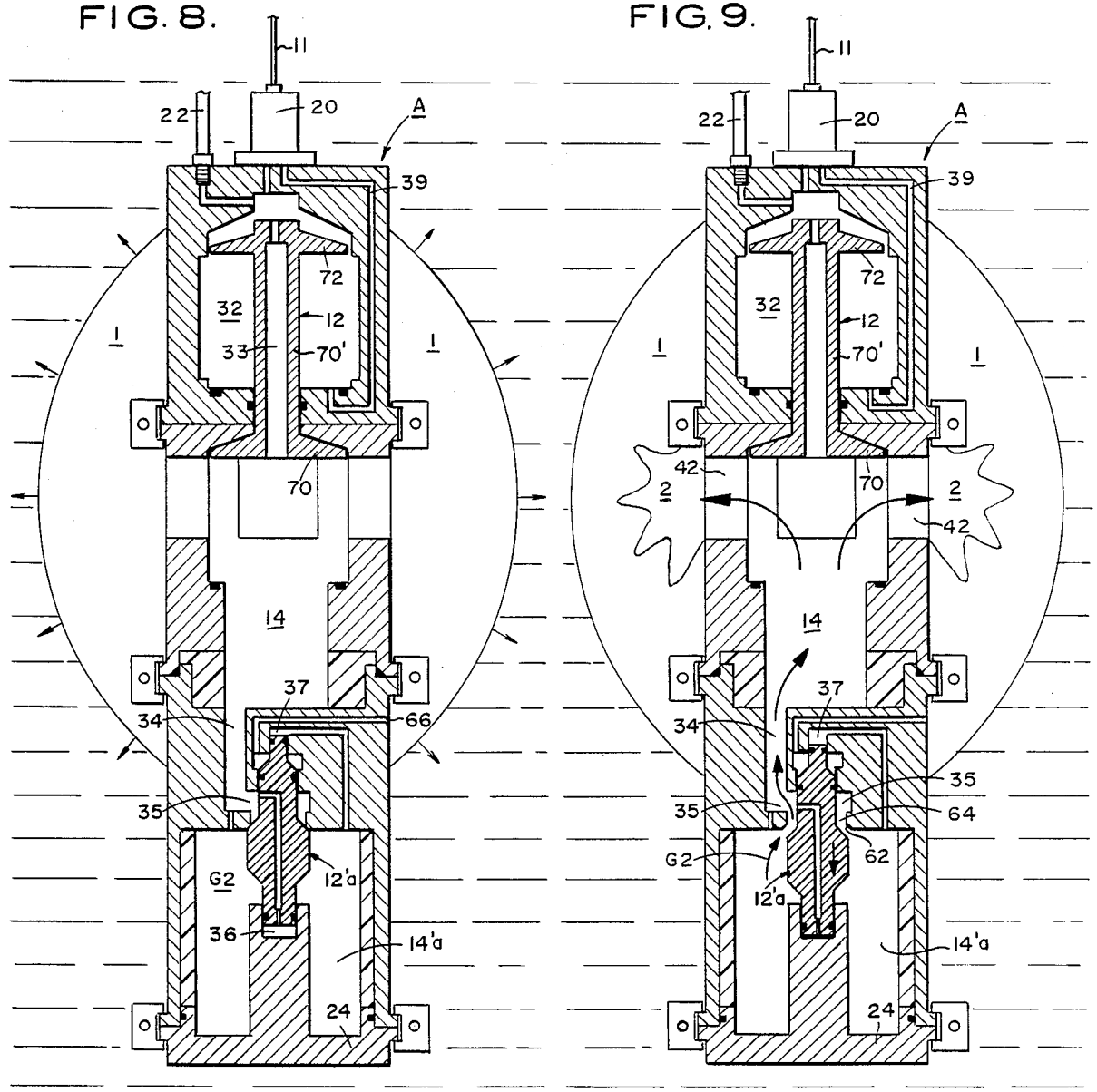
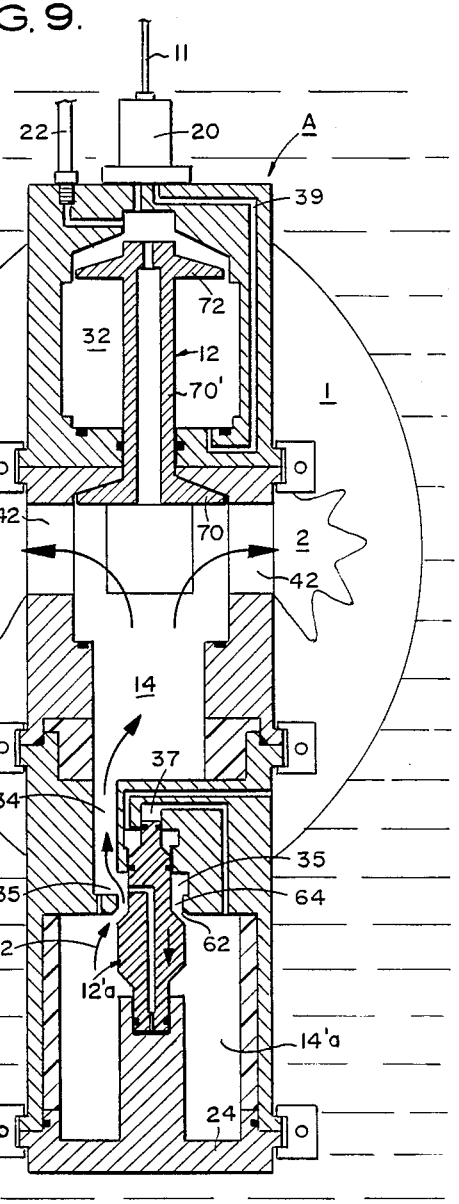
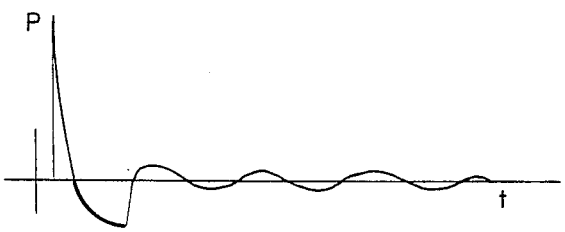
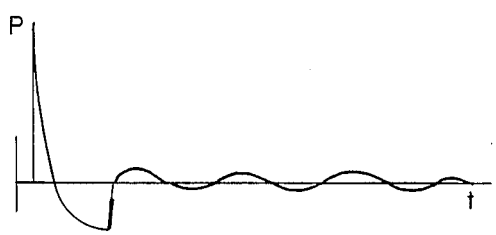
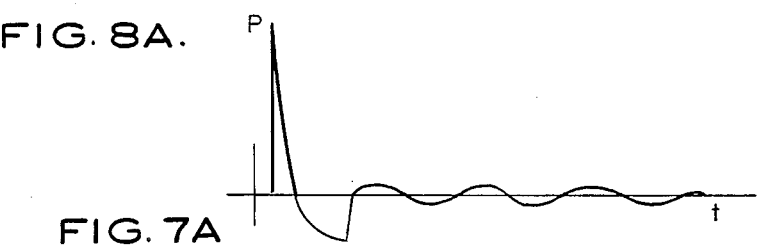

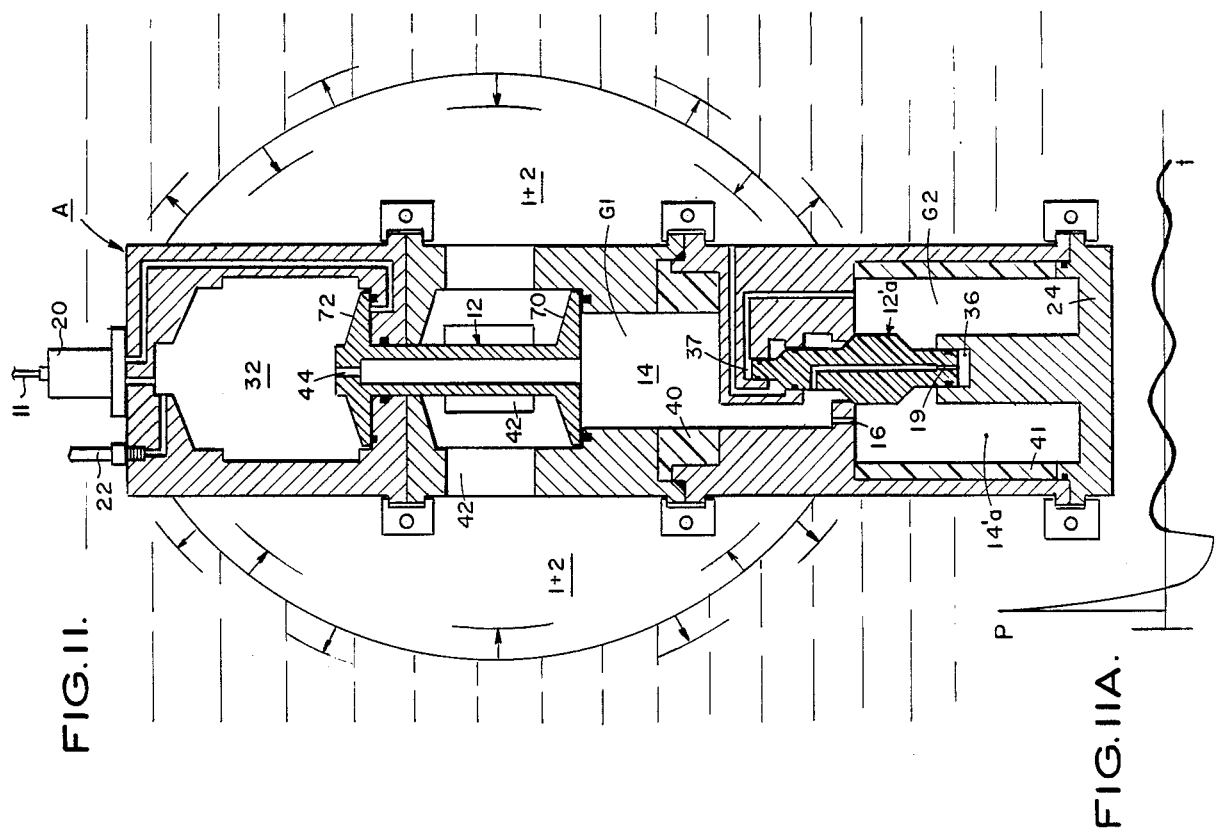
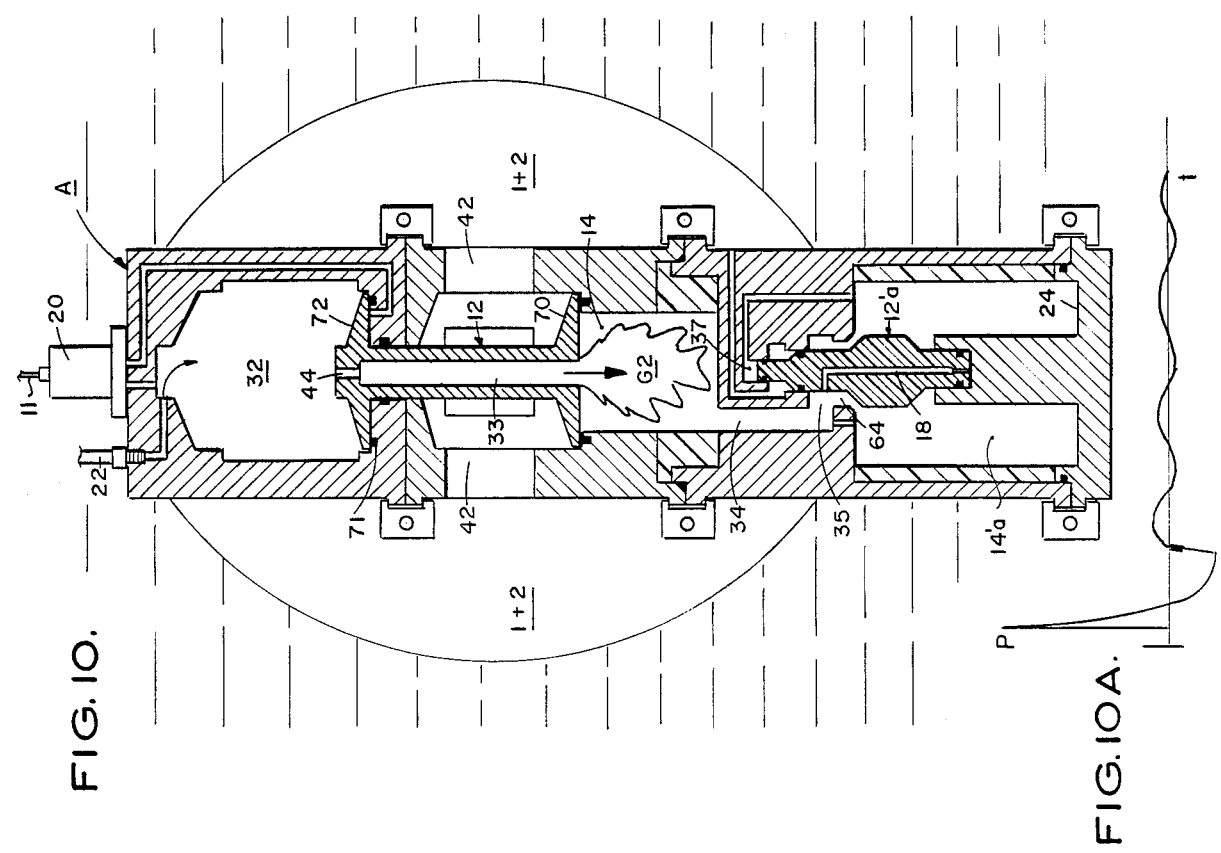

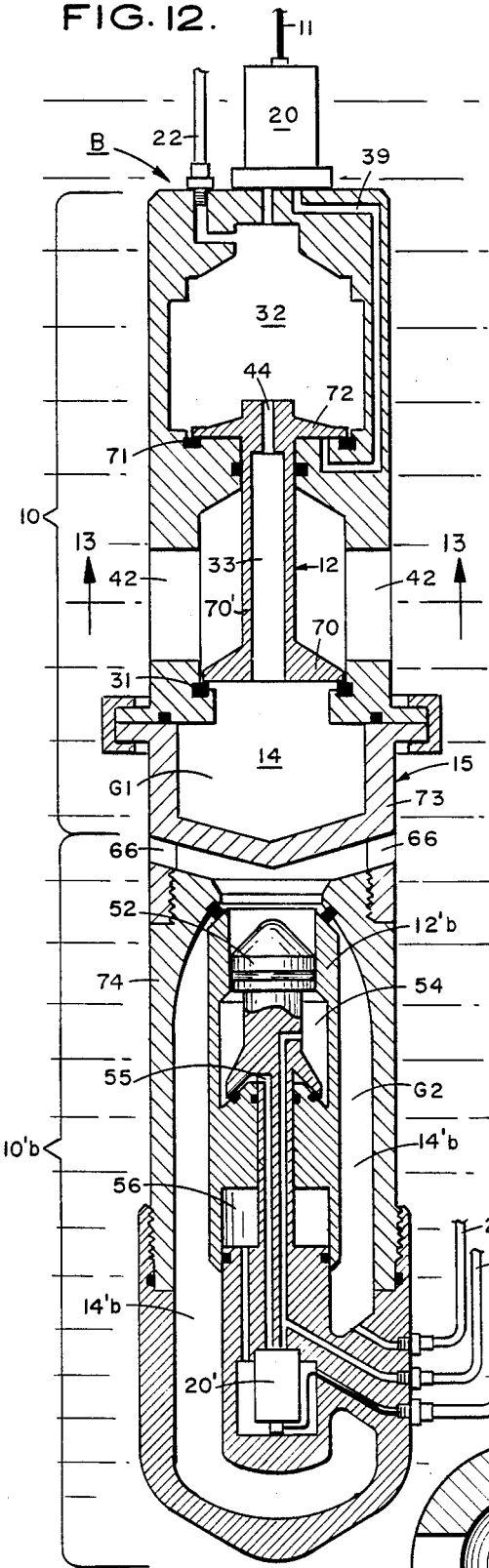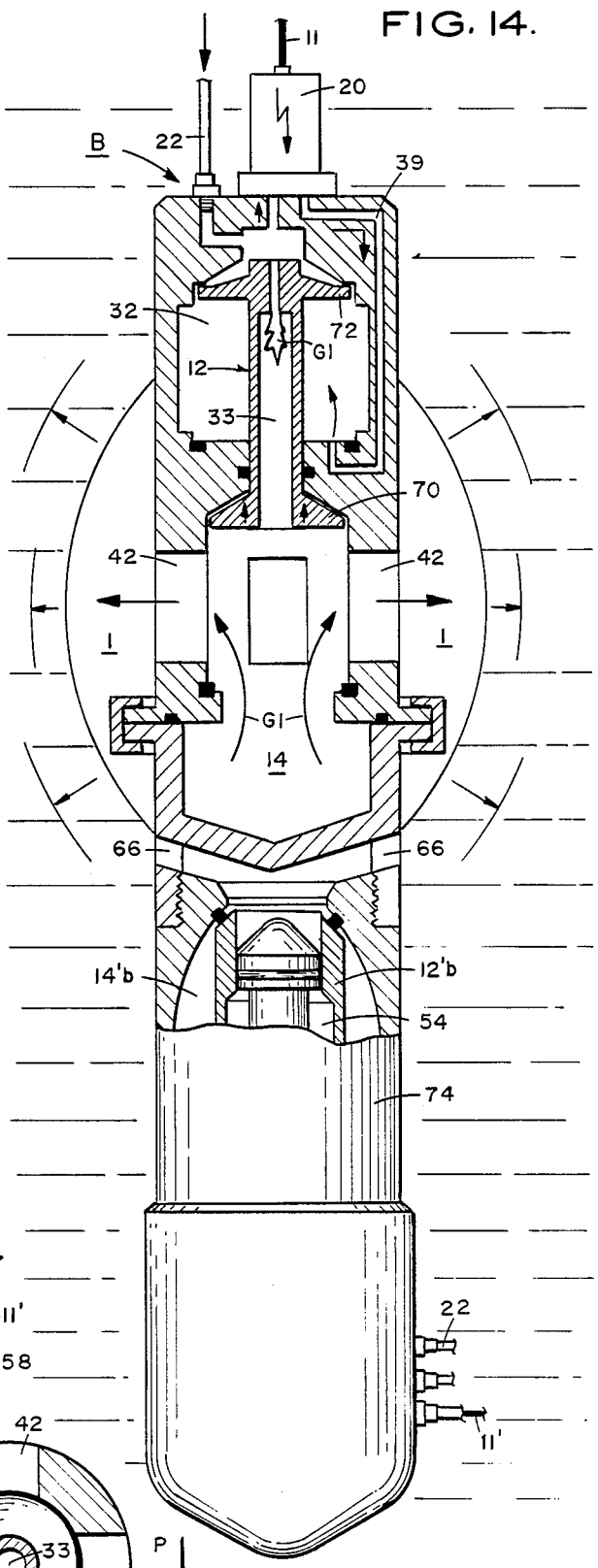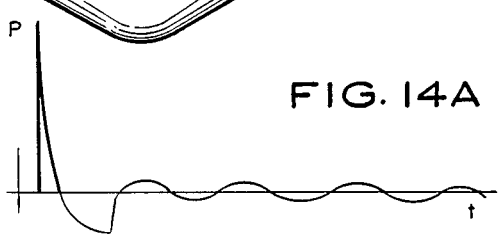
FIG. 12.
FIG. 13.
FIG. 14.
FIG. 14A.

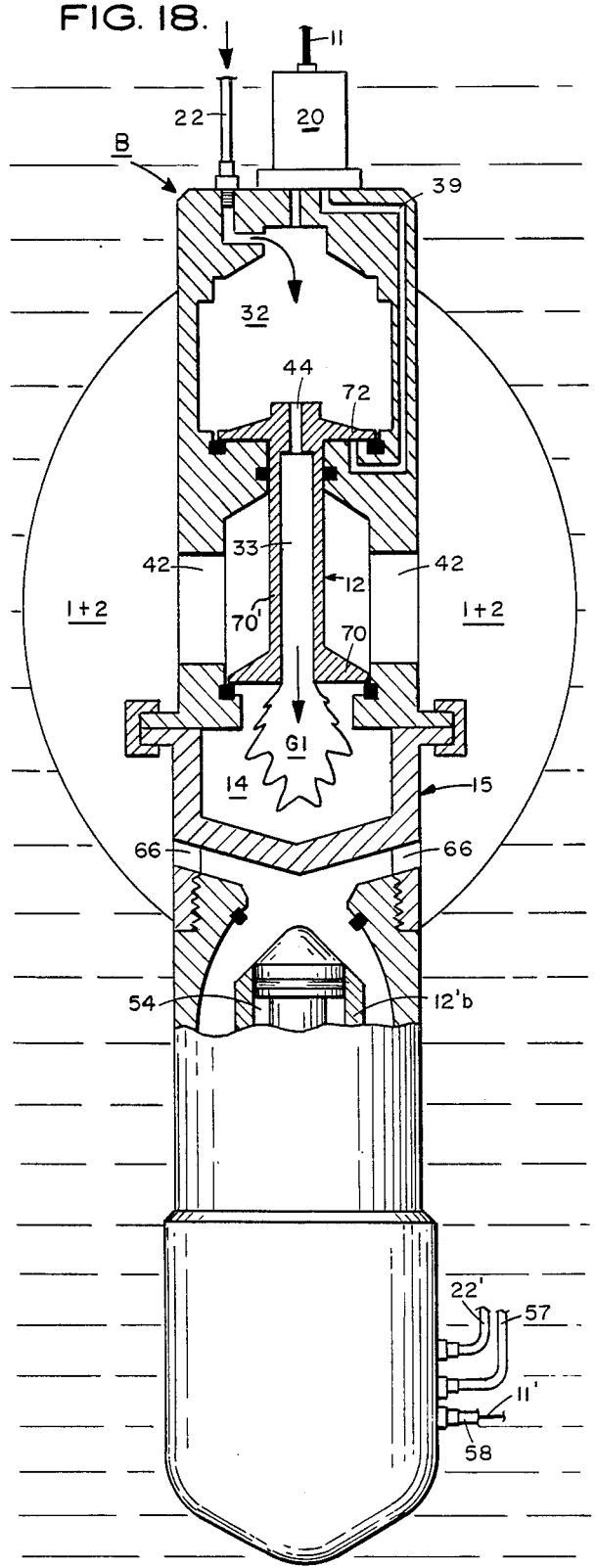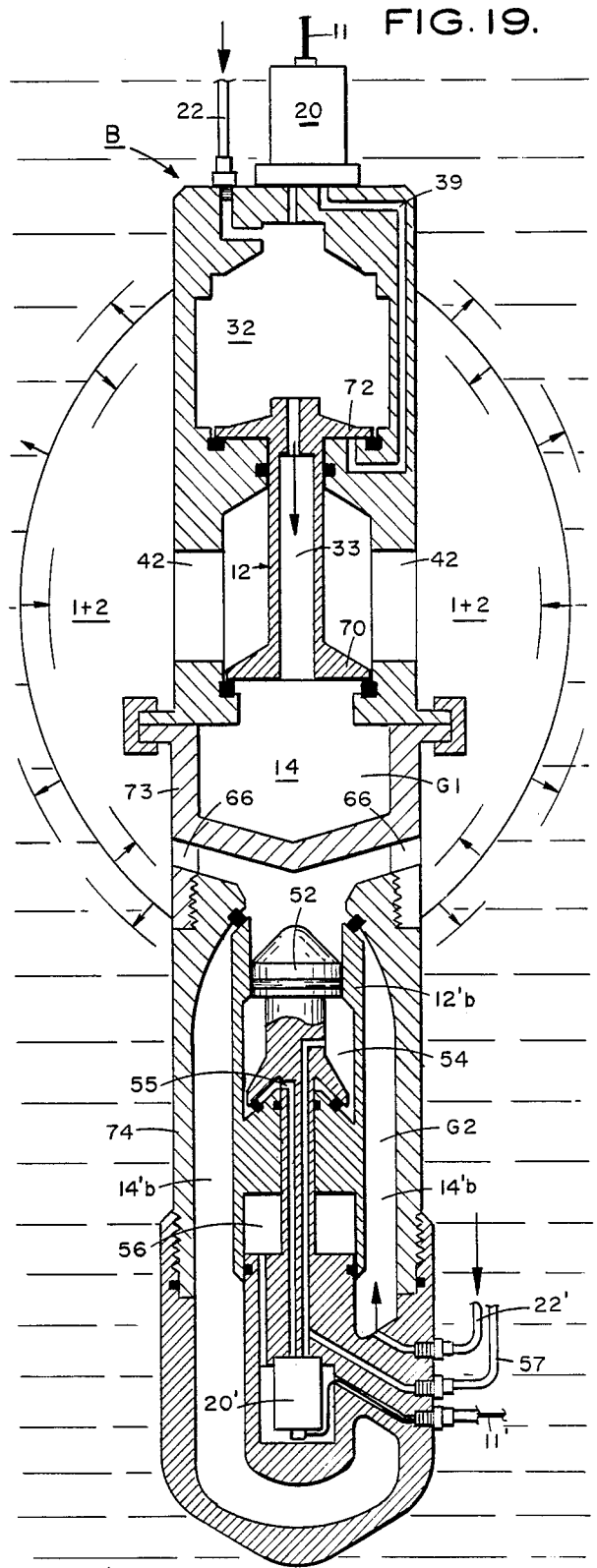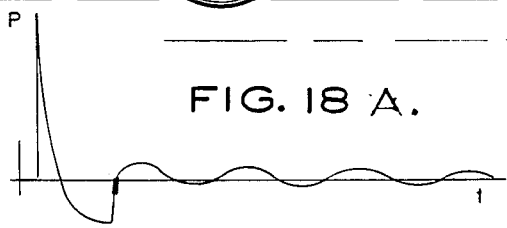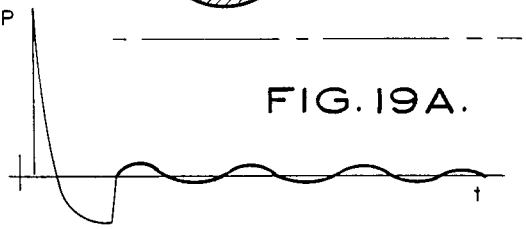

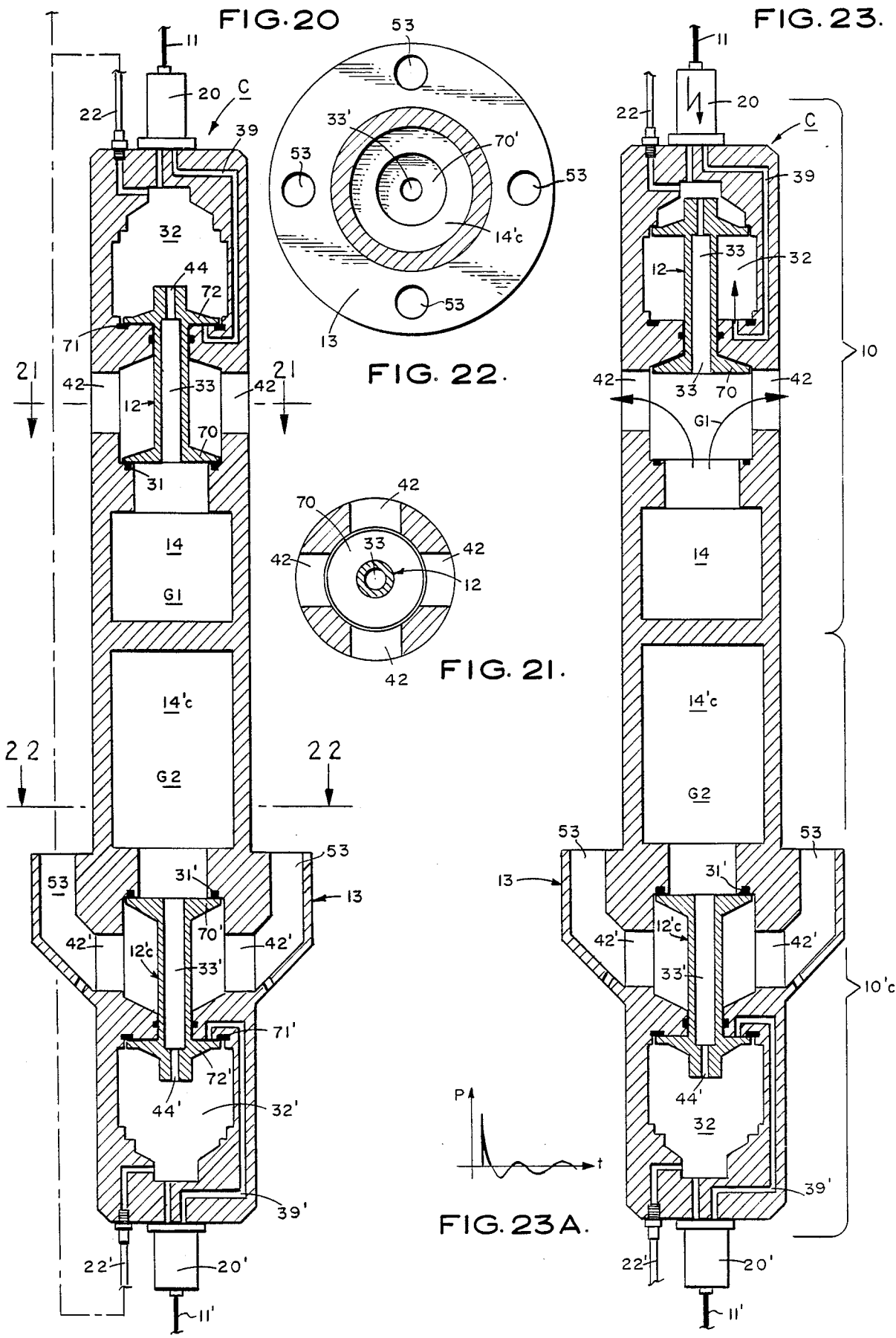

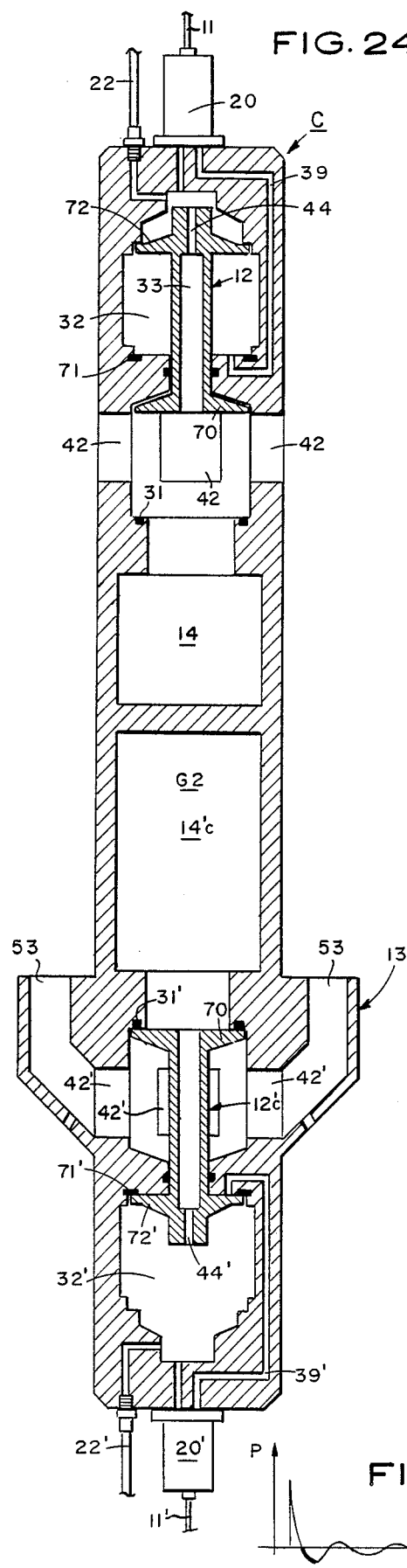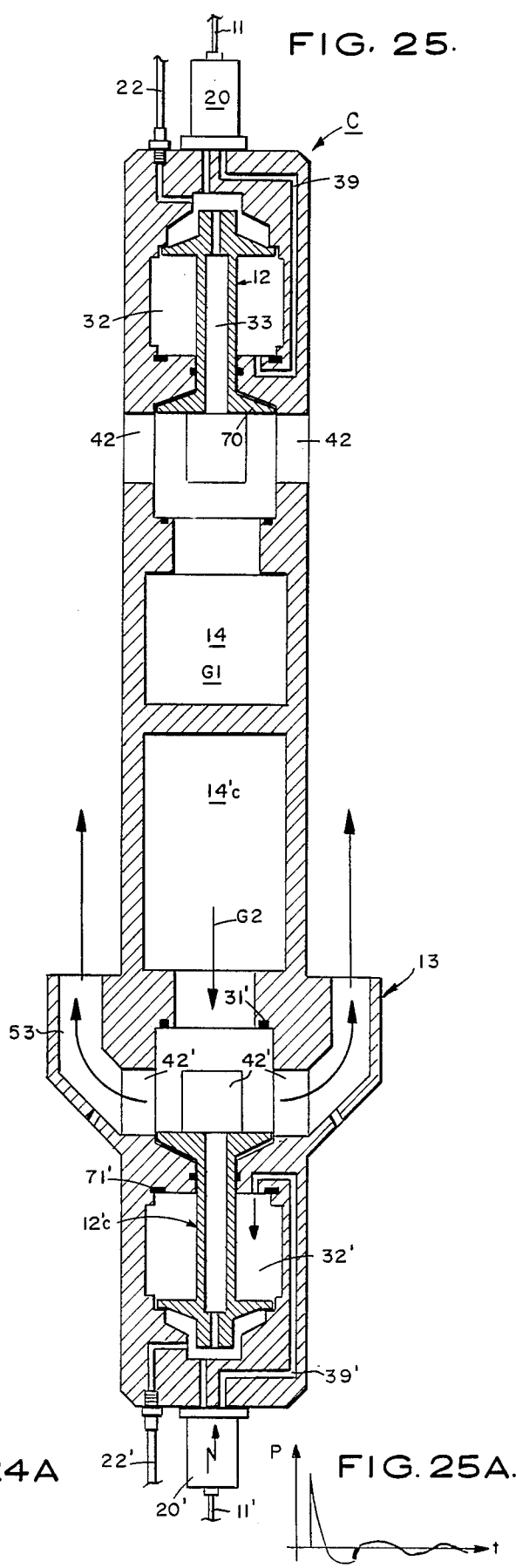

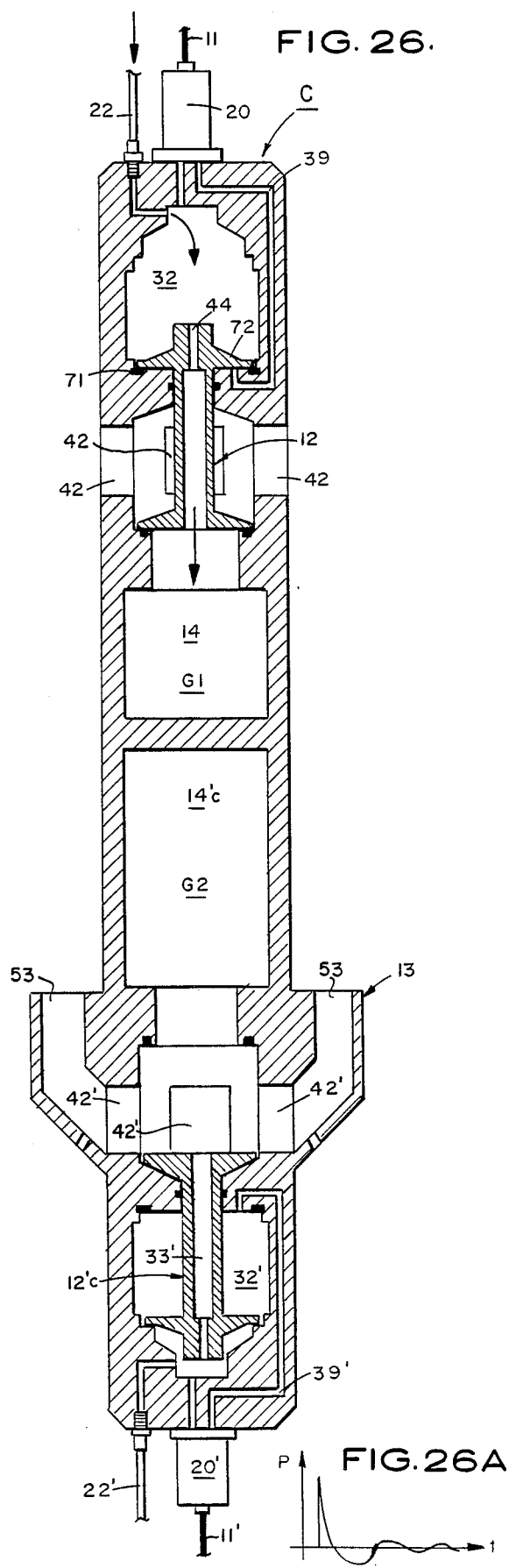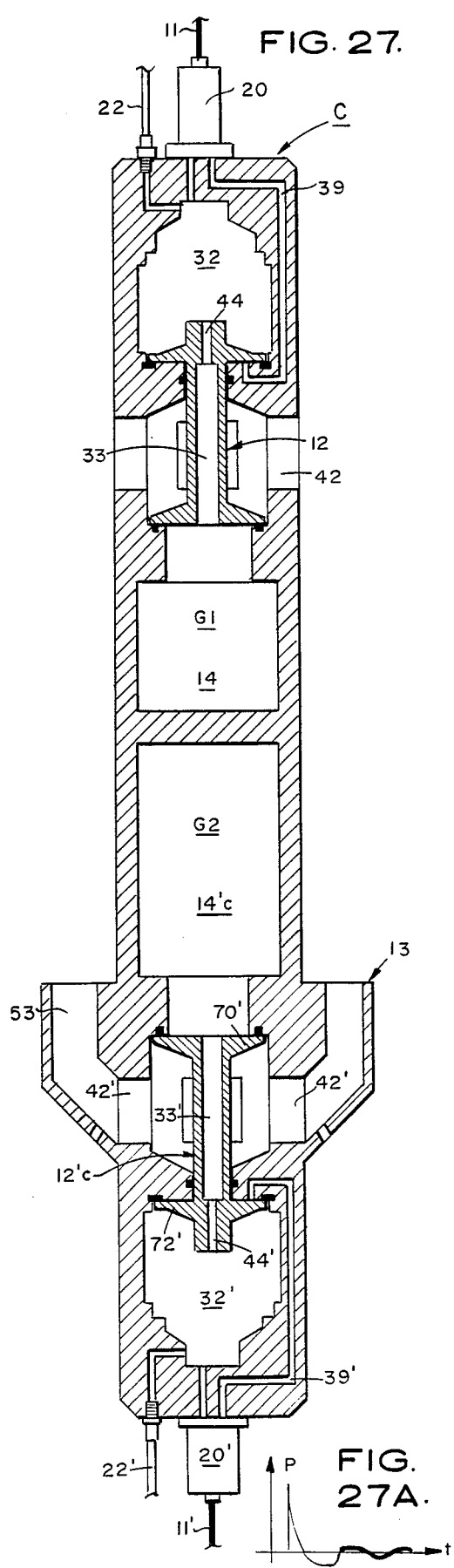

Va  45 in.³
P   2000 psi
D   7.5 m (25 ft.)

Va  45 in³
Pa  2000 psi
D   7.5 m (25 ft.)
Vb  95 in³
Pb  2000 psi
Td  23 msec

INTERNAL BUBBLE-SUPPRESSION METHOD AND APPARATUS

BACKGROUND OF THE INVENTION

1. Field Of The Invention

This invention generally relates to a method and apparatus for generating underwater sharp, impulsive acoustic signals, which are especially useful in marine seismic exploration and, in particular, to such acoustic sources which periodically and abruptly create a gas bubble at a sufficient depth below the water surface to allow the bubble to expand and contract.

2. Description Of The Prior Art

Certain seismic sources such as explosives, airguns, gas exploders, etc., are purposely fired deep under water. It is well known that such firing creates a gas bubble or cavity and that the water acquires oscillatory energy which generates acoustic pressure wavelets, each consisting of a desired "primary" acoustic pressure pulse $P_o$, which is especially useful for most seismic exploration work, and which is followed by an oscillating succession of undesired "secondary"(sometimes called "bubble") acoustic pulses of decreasing amplitude. In this specification, the words "bubble" and "cavity" will be used interchangeably.

For example, an airgun explosively releases a high pressure gas bubble into the water which creates the desired primary pulse having a maximum amplitude $P_o$. After the released high-pressure gas bubble impulsively contacts the surrounding water, it continues to expand as the water first accelerates outwardly and later decelerates until the cavity attains a maximum diameter and comes to rest, at which time the pressure within the cavity is much less than the surrounding hydrostatic pressure.

When the expanding bubble reaches its maximum diameter: there is practically a vacuum inside the bubble, the kinetic energy of the surrounding water is zero, and this water possesses maximum oscillatory potential energy which, if not suppressed, will change into kinetic energy, back into potential energy, etc., for a duration of several cycles, each having an oscillatory time period T.

The water gains maximum potential energy at $\frac{1}{2}$ T, at which time the water is ready to change course and rush inwardly to implode the gas in the bubble. After one complete cycle, i.e., at time T, the bubble is recompressed into a relatively small-diameter, high-pressure bubble. The surrounding water comes to an abrupt stop resulting in a first positive acoustic secondary pulse $P_2$ which is mainly dependent upon the maximum kinetic energy acquired by the inwardly-moving water. The less kinetic energy acquired by the water, the smaller $P_2$ will be.

Thus, the secondary pulse problem starts when the surrounding water for the first time violently implodes the bubble to a minimum diameter. When the bubble recompresses and attains a minimum diameter or volume, the kinetic energy is again zero and the potential energy is mainly contained within the recompressed gas inside the bubble. This potential energy causes the bubble to again explode in its oscillatory scheme.

In this manner, the oscillatory energy stored in the water produces several successive secondary pulses of decreasing amplitude until a portion of the energy of oscillation becomes dissipated by natural processes, such as turbulence, and the remaining portion is consumed to produce the undesired secondary pulses.

The number of such bubble explosions (expansions) and implosions (contraction) may vary, but typically four to six significant secondary pulses can be expected after each primary pulse $P_o$ which is generated by the seismic source.

Hence, a substantial portion of the acoustic energy released by the seismic source goes to waste because only a portion of the energy contained in the released gas is used to produce the desired primary seismic pulse $P_o$, while the remaining and substantial portion of the energy becomes converted into harmful secondary seismic pulses which must be suppressed.

Such secondary pulses are now being attenuated by using large arrays of differently sized airguns. All the airguns in the array are fired simultaneously so that the $P_o$ pulses are in phase for addition. Most of the secondary pulses are out of phase and therefore they cancel each other out.

In seismic exploration, both the primary and secondary acoustic pulses act as distinct acoustic disturbances, which travel in the water in all directions, penetrate the earth, strike one or more rock formations or reflectors, and then return into the body of water.

The primary and secondary pulses produce reflected seismic wavelets. But, since the secondary pulses and their reflected waves occur at times when the reflected primary waves also return from the subterranean reflectors, it will be apparent that the secondary pulses and their reflected wavelets interfere with the reflected primary waves.

Because the reflected secondary waves and the reflected primary waves are similar in shape, no practical way has yet been found for distinguishing between them.

The known prior art found neither a practical nor an economical solution for dealing with the "bubble" or secondary pulse problem when using a single explosive-type seismic source. For this reason now, and as previously mentioned, marine acoustic sources are used mostly in arrays to achieve bubble cancellation.

In conducting marine seismic surveys, the reflected primary and secondary seismic waves are sensed by detectors within a towed streamer cable. The detectors faithfully transform the received acoustic seismic waves into corresponding electric signals which are processed into seismic traces that contain appreciable noise. This noise is due nostly to the oscillatory secondary pulses which accompany each primary pulse.

Under these noisy conditions, computations of the depths at which the rock formations lie becomes very difficult and sometimes altogether impossible. The noise hinders the main object of the seismic exploration, which is, of course, to identify the various sub-bottom formations from an interpretation of the seismogram sections produced by the seismic survey.

The secondary-to-primary ratio $P_2/P_o$ is the yardstick by which all marine seismic sources are measured as to bubble suppression. An "ideal" source is said to be that source which has a ratio $P_2/P_0=0$ for a frequency range from 0-125 Hz. The extent to which a particular seismic source approaches the ideal seismic source can be readily measured by measuring its $P_2/P_o$ ratio.

An ideal seismic source produces a single, short, sharp acoustic impulse having sufficient energy and no secondary pulses. Sharp inpulses are needed to improve the defination of seismic reflections, because resolution is inversely proportional to the time-width of the impulse: the larger the time-width of the impulse, the less desireable it is.

Fired near the water surface, a dynamite charge closely approximates the ideal seismic source, because the bubbles resulting from each explosion are vented immediately into the atmosphere, hence there are no bubble implosions.

If not fired near the water surface, explosive seismic sources will produce undesired secondary pulses, unless some form of implosion suppression is utilized. Explosive seismic sources include explosives, airguns, gas-guns, expandable sleeve devices in which propane and oxygen are mixed to cause internal combustion, etc. All of these share the common bubble problem for which there has been no fully satisfactory solution, even though there has been a long-felt need to find a mechanism to enhance the desired primary pulse at the expense of the undesired secondary pulses.

In the absence of such a mechanism, many attempts have been made in the past twenty-five years or more by the oil companies and their seismic contractors to develop techniques for reducing the burden, financial and technological, imposed by the generation of the undesirable secondary pulses. These efforts were directed toward attentuating the oscillatory secondary pulses and/or to reduce their ill effects.

From the very early introduction of marine seismic sources, there was a continuous need for effective and economical bubble suppression devices. That need and the various solutions offered to fill that need are well described in the technical and patent literature. Only a few of these will be discussed below to illustrate the severity of the bubble problem and the diversity of attempts to solve it.

One early mechanical technique attempts to prevent the secondary pulses from traveling vertically downward towards the water bottom by substantially surrounding the gas bubble source with a container or cage having perforations, so that the expanding gas bubble would have to do work in order to force water through the perforations. The work done by the expanding gas bubble dissipates its internal energy, so that the ensuing secondary pulses will have reduced amplitudes. This technique was used in a seismic source trademarked FLEXOTIR.

A serious limitation inherent in this technique is that the desired primary pulses also become reduced in strength because they can travel freely only through the available perforations. Also, the perforated cage becomes subjected to rapid deterioration, due to the great stresses to which it becomes subjected when large differential pressures become exerted across its wall.

Various software programs have been also developed, for example, in connection with the MAX-IPULSE (trademark) seismic source, which utilize fast and powerful digital computers that produce seismograms from which the detected noisy seismic waves, caused by the deleterious bubble effects, have been removed so that the seismograms can be easier interpreted by the geophysicists. However, running such programs requires the use of expensive computer time and manpower, see U.S. Pat. No. 3,592,286.

Other techniques are based on air being injected into the expanding bubble for shaping the secondary pulses. The known applications of the air injection technique have led prior art workers to very disappointing results and most of them were abandoned.

In U.S. Pat No. 3,371,740, the injection of air during the expansion of the cavity might increase the size of the cavity without reducing the amount of kinetic energy stored in the water. The injected atmospheric pressure is too low. The cavity is allowed to implode for too long at a time, and therefore the water is allowed to acquire too much kinetic energy. For a firing depth of 30 ft, it can be shown that $P_2/P_o$ approaches 40%, which is far in excess of the acceptable 10% norm.

In U.S. Pat. No. 3,454,127, the injection is started too early during the expansion of the bubble. The flow rate of the injection is subsonic, which is insufficient to establish hydrostatic pressure inside the cavity within the required time interval, unless an impractical large gas volume is utilized. Also, the volatilization of a material cannot be used because a material cannot volatilize within the few milliseconds available for achieving hydrostatic pressure inside the cavity.

In U.S. Pat. No. 3,601,216, the final pressure established inside the cavity is not hydrostatic. The volume of gas injected is too small: only 9 ft$^3$ instead of 60 ft$^3$, which is needed. The start of the air injection is not defined, or at most it is defined as "when" the bubble is expanding, which is very imprecise. The time interval allowed for the injection is much too long, "preferably 50 ms," instead of the maximum 20 ms allowed. It uses low injection pressure (150 psi) which leads to severe practical and technical difficulties.

U.S. Pat. No. 3,653,460 involves the use of an airgun having a secondary chamber in addition to a main chamber. Upon the release of the compressed air from the main chamber, the secondary chamber releases its air into the main chamber, and thence out through the discharge ports in the airgun and into the expanding bubble. Air from the secondary chamber is throttled across an orifice which is contained in a dividing wall between the chambers. As a result, the flow rate is maximum when the bubble is small and expanding, and the flow rate is reduced when the bubble reaches its maximum size. This reduction in flow is due to the pressure decrease in the secondary chamber during the bubble expansion. In column 5, lines 1-30 of the last mentioned patent, it is shown that the volume of air injection required to bring the $P_2/P_o$ ratio down to 14% is 6.4 times the volume needed to generate the main pulse, which is inefficient, wasteful, and very costly in money and energy consumption. While the quantity of air being injected into the bubble may have some effect on the $P_2/P_o$ ratio, it is certainly not enough to keep this rato within acceptable limits or the standard of 10%, as is already achieved when using tuned airgun arrays, and does not allow the source to become a point source.

Due to the inefficiency or impracticability of known bubble suppression techniques, the seismic industry was obliged to employ a "tuned" array of seismic sources. Typically, these sources are airguns of markedly different sizes.

When all the airguns in a tuned array, using airguns of different sizes, are fired simultaneously, theoretically the amplitude of the resulting primary pulse of the array will be equal to the sum of the amplitudes of the individual primary pulses generated by the individual acoustic sources in the array, whereas the amplitudes of the secondary pulses will be reduced because (1) they are not in phase, (2) they occur at different times, and (3) they have random frequencies.

Nevertheless, the present state of the art in suppressing bubble pulses has been achieved by these "tuned" airgun arrays, which are now widely used.

The average characteristics of such a tuned arigun array are:

Output: 1 bar-meter per 60 in$^3$ of air at 2000 psi (peak to peak from 0–125 Hz), and a ratio of $P_2/P_o$ less than 1/10 or 10%.

Therefore, any source which generates bubble pulses must achieve about the same $P_2/P_o$ ratio of 10% or less, peak-to-peak from 0–125-Hz, in order to be competitive in the seismic industry.

Even though the array technique is now the standard in this art, it still has serious drawbacks because it is only a composite of individual sources, each source lacking a narrow, sharp acoustic pulse as required. Also, it is very expensive to build such an array because it requires a large number of differently-sized airguns, as well as heavy and expensive air compressors to provide the volume of 2000 psi air consumed by the large number of airguns.

There is also a need to maintain on boat a large inventory of spare parts to keep the differently-sized sources operational. The spare part problem is very serious, because in many parts of the world they are not available and they must be flown in from the home base. Many parts break down daily and some weekly due to salt water, pollution, unsuspected debris, high pressure, etc.

As a consequence, the art was obliged to use techniques which are known to have serious drawbacks in order to accommodate the demand for marine seismic prospecting.

Most importantly, the prior art failed to suppress the secondary pulses to acceptable levels which would make it possible to utilize a single-point seismic source, or an array of such sources of equal size.

In general, the known bubble suppression devices have the following drawbacks, taken singly or in combination: they are cumbersome; they require excessive support machinery and space therefor; they require very large compressors and excessive energy to run them; they are expensive to maintain; and they require an excessive inventory of expensive replacement parts to maintain in operational condition the different sizes of seismic sources now utilized to form arrays.

Accordingly, it is a broad object of this invention to remedy the above and other known shortcomings of the prior art, and to provide a practical, economical, and fully effective method for total bubble suppression.

It is another object of this invention to provide a seismic source which is bubble-free and therefore can be used alone for seismic prospecting. If more power is needed, my sources can be used to construct an array which is very beneficial, as will be subsequently described.

It is yet a further object to provide a bubble-free seismic source which is characterized by having a substantially flat power spectrum over a relatively broad frequency range, and which produces a single sharp acoustic impulse followed by negligible secondary pulses.

It is another object of this invention to provide such a novel energy source which has effective bubble suppression means, which is energy-efficient, which lends itself to become easily incorporated into existing marine seismic energy sources and methods of using them without affecting the utility of such known sources and methods, which is simple in design, compact in use, and relatively inexpensive to manufacture and maintain, and in which the volume of air required for aborting the implosion is reduced to a small fraction of what was generally believed to be necessary to achieve adequate bubble suppression, that is, to achieve $P_2/P_o = 10\%$ or less.

SUMMARY OF THE INVENTION

The novel method substantially reduces the pressure pulse generated by an implosion of a cavity within a body of water by aborting the implosion. The abortion of the implosion is produced by generating within the cavity an explosion at the instant that this cavity attains its maximum volume. The explosion is to have sufficient energy to establish hydrostatic pressure within the cavity. the explosion must start and hydrostatic must be established while the volume of the cavity remains within a few percent of its maximum volume.

The method can also be used to generate within a body of water an impulsive acoustic signal by generating a first explosion within the body of water to produce therein a powerful pressure pulse and a cavity of very low pressure, and then generating a second explosion within the cavity so as to establish hydrostatic pressure inside the cavity while the volume of the cavity remains within a few percent of its maximum volume.

The apparatus comprises first and second explosive generators which consecutively create two explosions within the body of water: a first explosion which produces within the body of water a powerful acoustic pulse and an expanding cavity of very low pressure, and a second explosion which establishes hydrostatic pressure within the cavity while the volume of the cavity remains within a few percent of its maximum volume, thereby substantially reducing the ensuing secondary pressure pulses.

BRIEF DESCRIPTION OF THE DRAWINGS

FIG. 5 is an enlarged sectional view of the fast-acting valve in the suppressor shown in FIG. 6;

FIGS. 6, 7–11 are sectional views of one embodiment of the invention, showing six operating phases thereof;

FIGS. 7A–11A are pressure signatures obtained with the embodiment shown in FIGS. 7–11, respectively;

FIGS. 12, 14–19 are sectional views of a second embodiment of the invention, showing six operating phases thereof;

FIG. 13 is a sectional view taken on line 13—13 of FIG. 12;

FIGS. 14A, 15A, 17A–19A are pressure signatures obtained with the embodiment shown in FIGS. 14, 15, and 17–19 respectively;

FIGS. 20, 23–27 are sectional views of a third embodiment of the invention, showing six operating phases thereof;

FIGS. 21 and 22 are sectional views taken on lines 21—21 and 22—22 respectively;

FIGS. 23A-27A are pressure signatures obtained with the embodiment shown in FIGS. 23-27 respectively;

FIG. 28 is a sectional view taken on line 28—28 in FIG. 29;

FIG. 30 is a sectional view taken on line 30—30 in FIG. 31;

FIG. 32 is a sectional view taken on line 32—32 in FIG. 33;

FIGS. 36 and 37 are pressure vs. time and power spectrum vs. frequency plots, respectively, of signal generator 10 operating together with generator 10'a;

DESCRIPTION OF PREFERRED EMBODIMENTS

Conventional methods for operating explosive marine seismic sources involve generating a first explosion which releases at a depth D in a body of water, at a time $T_o$ (FIG. 1), a first bubble 1 having a gas G1, a pressure Pa, and a volume Va. The pressure inside bubble 1 varies relative to the hydrostatic pressure, as bubble 1 undergoes cyclic implosions (contractions) and explosions (expansions) at an oscillatory period T.

The pressure signature (FIG. 2) exhibits a desired pressure peak $P_o$ as well as undesired positive (P2, P4, ...) secondary pressure pulses of decreasing amplitude.

It has been suggested that prior to the time that bubble 1 reaches its maximum diameter at T/2, if the pressure inside bubble 1 were raised by an injection of gas, then the amplitudes of the secondary pressure pulses, resulting from the subsequent implosions and explosion of bubble 1, would be substantially reduced, as compared to the amplitudes of the secondary pulses which would be produced without such gas injection. I found this general belief to be incomplete and inaccurate.

Figure 4:
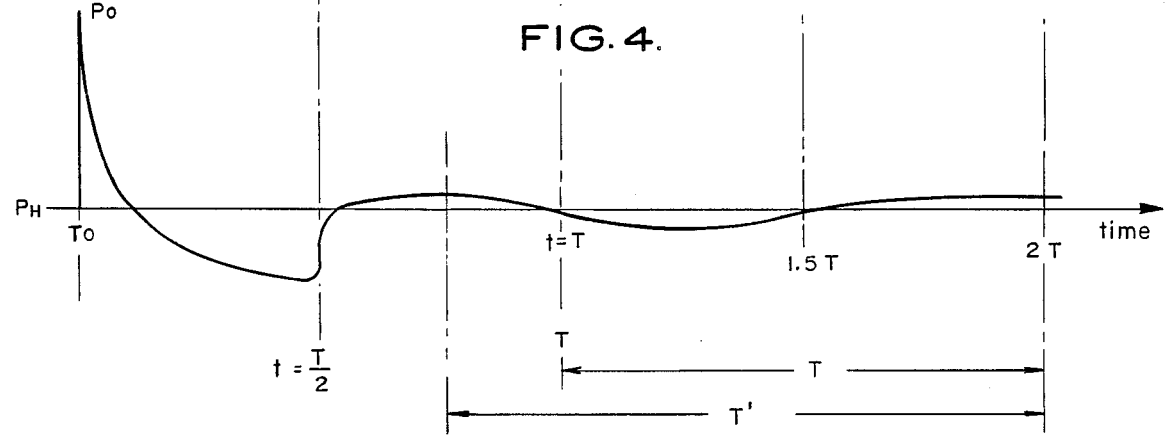
FIG. 4 is a pressure vs. time signature corresponding to FIG.3.

I have unexpectedly discovered way prior art workers in this art have failed to fill the long-existing need for single explosive marine seismic source, which is characterized by a secondary-to-primary $P_2/P_o$ ratio of about 10% or less (FIG. 4).

I have unexpectedly discovered theoretically and experimentally that the secondary pressure pulse generated by the implosion increases very rapidly at the early stage of the collapse of the cavity.

For instance, if one wants to maintain the secondary to primary ratio $P_2/P_o$ within 10%, one must not allow the radius of the cavity to shrink by more than 1%, or the volume of the cavity to shrink by more than about 3%.

I have unexpectedly discovered that what is actually required is:

no air injection while the bubble is expanding, and an explosive injection of air only when the bubble is within a few percent of its maximum size.

Using my method the injection volume of air required to bring the $P_2/P_o$ ratio down to less than 10% is only 2.1 times (as compared to 6.4, as previously mentioned) the volume of air needed to generate the main pulse $P_o$, which constitutes a reduction by a factor of 3.05 = 6.4/2.1 or more in the volume of compressed air needed for adequate bubble suppression.

Figure 1:
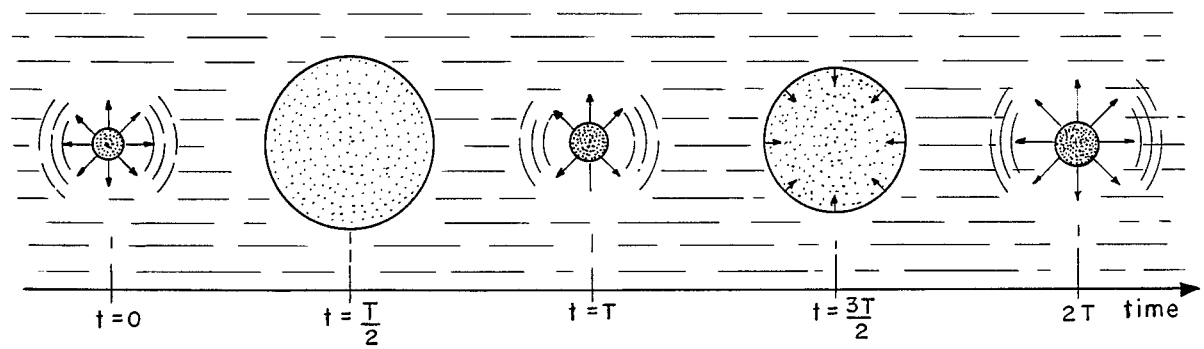
FIG. 1 illustrates an oscillating bubble in a body of water.

Surprisingly, I have discovered that the timing and the duration of the required air injection into the bubble must be extremely short. I have found that the gas injection into the bubble must be explosive and that bubble 1 must be stabilized very near to its maximum size, which means that one must abort or suppress the first implosion by making an explosive air injection before the first implosion shrinks the maximum diameter of bubble 1 by more than 1%. The bubble's maximum diameter is that diameter which bubble 1 would attain without such air injection (FIG. 1).

Thus, I generate two consecutive explosions within milliseconds of each other to obtain an ideal seismic impulse similar to that obtained from firing an explosive near the water surface and allowing the bubbles to vent directly to the atmosphere before they can implode.

I generate a timely and sufficient suppression explosion (FIG. 3) which impulsively injects a bubble 2 into bubble 1 during a short time interval Ti. Bubble 2 is formed by a gas G2 having a pressure Pb and a volume Vb. For convenience Pb is made equal to Pa, where Pa is the pressure of gas G1 which was previously used in the first explosion to generate bubble 1.

I further found that the volume Vb of gas G2 (FIG. 3) required for explosively injecting into bubble 1 is only a fraction of the gas volume that was generally believed to be necessary to achieve adequate bubble suppression.

Operating Conditions

It is now possible with my second explosion, which produces bubble 2, to completely abort the undesired oscillatory secondary pressure pulses (FIG. 4) resulting from the first explosion, if certain very critical conditions are satisfied:

1. the explosive injection time interval Ti (FIG. 3) must be equal to or less than 0.2T, where T is the period of oscillation of bubble 1, as given by the detected acoustic signal, which is known in the art as the "pressure signature";

2. Ti must start after 0.4T and end before 0.6T; and 3. the second explosion must have sufficient energy to establish hydrostatic pressure within bubble 1.

Figure 3:
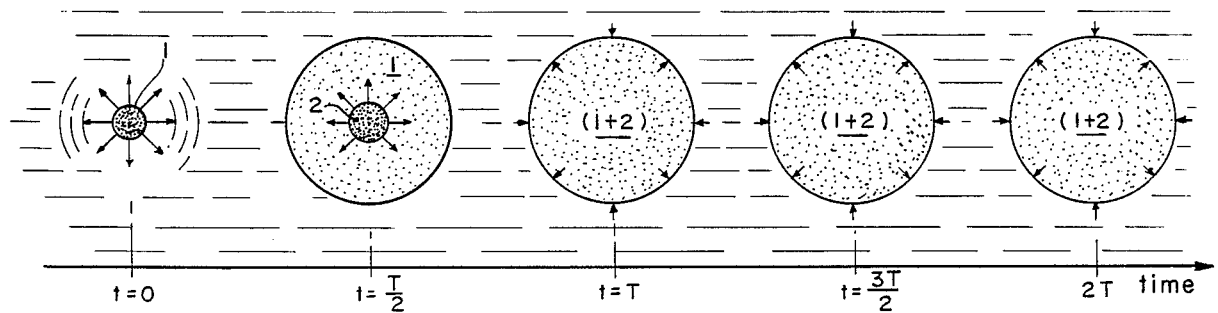
FIG. 3 illustrates the behavior of bubble 1 when acted upon by bubble 2 in accordance with the invention.

Ti should optimally be centered about T/2 (i.e., when bubble 1 reaches its maximum volume). Under optimum conditions $P_2/P_o = 0$, and the second explosion will stop and copletely abort the first implosion (FIG. 3).

The optimum value for $V_b$ in order to achieve $P_2/P_o$ less than 10%, is $V_b = k \times V_a$, where k is a number in the range between 1.8 and 2.6.

My acoustic marine source will be illustrated by embodiments A, B, and C which have common elements that will be designated with the same reference characters, to simplify the description. Similar elements will be designated with a prime (') whenever possible.

Each one of my embodiments A–C has an explosive signal generator 10 and an explosive suppressor generator 10', which can be the same as or different from generator 10.

Figure 2:
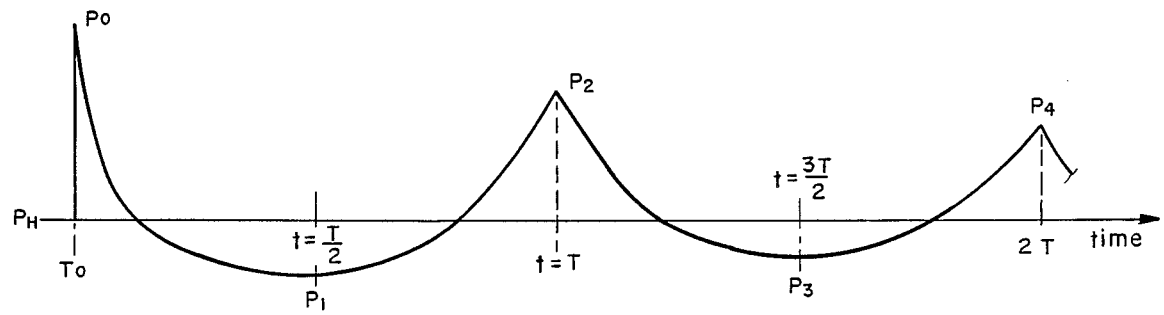
FIG. 2 is a pressure vs. time signature for FIG. 1.

I can employ, for example, a conventional explosive signal generator 10 (FIG. 6) for generating at a predetermined and sufficient depth within a body of water a signal explosion, which produces at time $T_o$ bubble 1 and a desired primary pulse $P_o$ (FIGS. 3,4,7A). In the absence of my suppression explosion, bubble 1 would undergo a series of implosions and explosions (FIG. 1) at an oscillating period T, which would result in the undesirable secondary peaks (P2, P4 . . . ) of decreasing amplitude (FIG. 2).

To abort the first implosion, I employ an explosive suppressor generator 10' which generates a counter explosion inside bubble 1 within a time interval less than 0.2T and which satisfies the above critical conditions.

Explosive signal generator 10 can be a commercially available airgun, such as the one manufactured under the trademark PAR, which is fully described in U.S. Pat. No. 3,379,273. Such an airgun has a signalschamber 14 whose volume Va is charged up with pressurized air G1. Chamber 14 communicates directly with an explosive shuttle valve 12 that can be actuated to explosively discharge the pressurized air G1 from signal chamber 14 into the surrounding body of water through discharge ports 42.

Valve 12 includes a main piston 70 engageable with a seal 31 for retaining a charge of pressurized gas G1 within signal chamber 14, and a control piston 72 engageable with a seal 71 for controlling the movements of piston 70. Pistons 70 and 72 are held together, in spaced parallel relation, by a hollow shaft 70' having an axial bore 33 therethrough.

A compressor on the deck of the seismic vessel (not shown) supplies air pressure to input line 22 at 2000 psig, which is fed to a control or return chamber 32 from which it passes through a metering orifice 44 and axial bore 33 into signal chamber 14.

The actuation of valve 12 is controlled by a controller such as a solenoid-operated valve 20, which is energized periodically by a short electric pulse produced by a conventional electronic actuating network (not shown) located on the deck of the seismic vessel. The firing of explosive generator 10 is periodically repeated as dictated by the firing cycle of the seismic survey.

When solenoid valve 20 is fired, pressurized gas flows from a line 22 through a trigger passage 39 leading to the opposite surface of control piston 72 from the facing control chamber 32. Thus, the holding force of the air pressure in control chamber 32 becomes instantaneously offset, allowing the pressurized gas G1 in the signal chamber 14 to suddenly accelerate main piston 70 away from its seal 31, thereby suddenly opening the discharge ports 42 and allowing them to communicate directly with signal chamber 14.

Then, the pressurized gas G1 from signal chamber 14 is explosively released through discharge ports 42 into the surrounding water wherein it generates a long acoustic seismic wavelet or pressure signature (FIG. 2) having the desired acoustic primary pulse Po, which is followed by the undesired positive (P2,P4 . . . ) pressure pulses.

After the discharge of gas G1 from signal chamber 14, the pressure in control chamber 32 returns shuttle 12 to its closed position, and generator 10 is ready for a new cycle.

I. Source A.

With general reference to FIGS. 5–11 of the drawings, my novel single point acoustic marine source A comprises, in addition to the explosive signal generator 10, which can be the PAR airgun as described above, an explosive suppressor generator 10'a having a suppression chamber 14'a which contains a volume Vb of gas G2. For the sake of economy Pb=Pa. Generator 10'a is fixedly secured to and is axially aligned with generator 10.

Generator 10'a also has an explosive shuttle valve 12'a which, upon actuation, explosively discharges the gas G2 from suppression chamber 14'a into chamber 14 and thence into bubble 1 surrounding discharge ports 42 of signal generator 10.

The high-pressure air from signal chamber 14 (FIGS. 5–6) is transmitted, through axial bore 18 in valve 12'a and through a metering orifice 19, to a delay chamber 36 which keeps explosive valve 12'a closed.

When explosive generator 10 is ready to become fired, signal chamber 14 has 2000 psi, and valve 12'a is being kept closed by the 2000 psi pressure in delay chamber 36.

Pneumatic means delay the release of compressed gas G2, after the discharge of gas G1, by a time delay interval Td depending upon the period T of the oscillatory characteristics of bubble 1.

In operation explosive generator 10 (FIGS. 5,7) is fired at $T_o$ (FIG. 4), when solenoid 20 becomes energized by an electric pulse signal arriving on line 11, which causes valve 12 to explosively discharge gas G1 from signal chamber 14 through ports 42 into the surrounding water. After chamber 14 is discharged, the 2000 psi air in delay chamber 36 gradually flows across orifice 19 into chamber 14 until the pressure in chamber 36 drops to about 200 psi, at which time valve 12'a explosively opens and releases gas G2 from suppression chamber 14'a into channel 34, and thence into signal chamber 14 and outwardly through the discharge ports 42 of explosive valve 12.

After about 60 ms, both signal chamber 14 and suppression chamber 14'a start to repressurize to become ready for another cycle. At about 500 ms, explosive valve 12'a closes.

Signal chamber 14 always pressurizes at the same rate, whereas chamber 14'a charges through throttling orifice 17, which has to be large enough to allow chamber 14'a to become pressurized within the given firing cycle for signal generator 10, but orifice 17 also has to be sufficiently small to prevent releasing pressurized air from suppression chamber 14'a through chamber 14 into bubble 1 between the time interval 0–35 ms.

Detailed Description Of One Operating Cycle

The pressure in a particular volume or space "S" will be designated by "Ps" to simplify the description. Thus, for example, P14 means the pressure in the space defined by chamber 14.

PHASE 1. Generator 10 Ready To Fire

Solenoid valve 20 (FIG. 6) is closed.

Shuttle 12 is forced downward against ring 31 and seals signal chamber 14.

Source A is pressurized:

$P32 = P33 = P14 = P34 = P35 = P36 = P14'a = P37 = 2000$ psi.

$P38 = P39 = Ph$ (hydrostatic pressure) $= 17$ psi.

Valve 12'a is in its up position and seals suppression chamber 14'a with an upward force $$F = 2000\ psi \times (S2 - S3)\ in^2.$$

Volumes

Signal chamber 14 has a volume $$Va = V14 + V34 + V35 + V33 = 45\ in^3.$$

Suppression chamber 14'a has a volume $$Vb = V14'a = 95\ in^3.$$

$$Vb/Va = 95/45 = 2.1$$

These volumes can be changed with differently-sized inserts such as 40 and 41.

PHASE 2. Generator 10 exploded And $P_o$ Generated At t = 0 (FIGS. 7, 7A).

Firing of explosive generator 10 is initiated by energizing solenoid valve 20 with a short electric pulse on line 11.

Shuttle 12 moves up explosively to allow the compressed air G1 (2000 psi) from signal chamber 14 to discharge explosively through ports 42 into the surrounding water and to form therein bubble 1.

The explosive release of air G1 from chamber 14 generates the desird primary acoustic pulse $P_o$, as Shown in the pressure signature (FIG. 7A).

Bubble 1 continues to expand (FIG. 3).

PHASE 3. Bubble 1 Is Close To Its Maximum Size At t = 30 ms (FIGS. 3,3A).

Bubble 1 is close to its maximum size.

Pressure inside bubble 1 is much less than the hydrostatic pressure; actually bubble 1, at this instant, can be considered a vacuum cavity.

A negative pulse P1 appears on the pressure signature at T/2.

The compressed air from delay chamber 36 (V = 1.46 in³) is throttled across orifice 19, whose diameter is 0.16 in. Because the pressure in delay chamber 36 is still high enough to maintain explosive shuttle valve 12'a in its closed position, explosive suppressor generator 10'a is still in its stand-by mode.

PHASE 4. Generator 10'a Generates An Explosion Inside Bubble 1

At t = 35 ms (FIGS. 9, 9A).

When pressure in delay chamber 36 drops to about 200 psi, the force against explosive valve 12'a reverses. Valve 12'a starts moving downwardly. The downward force on valve 12'a instantly becomes:

$F = P14'a(S4 - S2) + P37\ (S3) - P36\ (S4),$ or approximately $F = P14'a(S2 - S2) = 2000\ psi \times (S1 - S2).$ Because of its very light weight, explosive shuttle valve 12'a is fully open within about 2 ms, allowing gas G2 from suppression chamber 14'a to explosively discharge and in effect form a second bubble 2 inside bubble 1 (FIG. 3). Gas G2 flows through signal chamber 14 and through discharge ports 42 into bubble 1. Bubble 2 has a volume of air Vb which is selected so that it can establish hydrostatic pressure inside bubble (1+2) when pressure equilibrium is reached therein.

The acoustic pressure signal shows an upward vertical step on the pressure signature.

PHASE 5. Hydrostatic Pressure Established Inside Bubble

At t = 40 ms (FIGS. 10–10A).

The amplitude of the acoustic signal is near zero.

Valve 12'a remains open because metering orifice 43 (FIG. 5) prevents the pressure in chamber 37 from dropping too quickly.

The downward force on valve 12'a of explosive generator 10'a is: $F = 1400\ psi \times (S3)$, approximately.

Because of the 2000 psi pressure in return chamber 32, Shuttle valve 12 of explosive generator 10 will move downwardly and seal against ring 31.

PHASE 6. Bubble 1 Is Stabilized And Oscillates Gently Around Its Equilibrium Position The implosion of bubble 1 has been aborted.

Bubble (1+2) is stabilized and its boundary (FIGS. 11-11A) undergoes low-amplitude, low-frequency oscillations which generate a very low-amplitude, low-frequency acoustic wave.

Signal chamber 14 is again pressurized through orifice 44.

When the pressure in delay chamber 36 (FIG. 5) of valve 12'a rises to about 1000 psi, valve 12'a will move up to again seal off suppression chamber 14'a. Gas G2 will again charge up chamber 14'a through throttling orifice 17 having a diameter of 0.1 in.

The upward force on valve 12'a becomes $F = P36\ (S4) - P35\ (S4 - S2) - P37\ (S3).$ Chamber 37 is pressurized through orifice 43 whose diameter is 0.06 in.

Source A is now ready for a new cycle.

Detailed Description Of Explosive Shuttle Valve 12'a

Explosive valve 12'a (FIGS. 5–6) is entirely pneumatically operated and has a body 23 which defines three air chambers 14'a, 36, and 37, and one water chamber 38. The body 23 also defines bores 25, 26 and sealing seat 62. Pistons 29, 30, 61 and 63 form shuttle valve 12'a. The bottom end cover 24 defines a bore 27 in which piston 63 slides. Pistons 29, 30 and 63 are slidably and sealingly mounted inside bores 25, 26 and 27, respectively. Suppression chamber 14'a continuously communicates with signal chamber 14 through bores 34, 35, 16, and metering orifice 17. However, when shuttle 12'a is in its open or lower position, chamber 14'a also communicates through channel 64 with annular chamber 35. When shuttle 12'a is at its lower position, its piston 61 disengages from seat 62, which allows channel 64 to freely communicate with suppression chamber 14'a and with signal chamber 14.

Delay chamber 36 continuously communicates with chamber 35 through radial bore 28, axial bore 18, and orifice 19. Air chamber 37 continuously communicates with suppression chamber 14'a through orifice 43 and a line 65.

When shuttle 12'a is in its closed or upper position, its piston 61 sealingly engages seat 62, thereby sealing off suppression chamber 14'a from chamber 35 and from bore 34, except from the small orifice 17 in line 16.

Operation Of Shuttle Valve 12'a

At the start, i.e., prior to t=0 (FIG. 4), volumes 34, 35, 14'a, 36 and 37 are pressurized to 2000 psi. Water chamber 38 is filled with water at hydrostatic pressure. Forces exerted on shuttle 12'a push piston 61 upward against its seal 62. Channel 64 is closed.

After explosive signal generator 10 is fired, air pressure in volumes 34 and 35 decreases very quickly and the upward force increases on piston 61 against its seal 62, while pressure in delay chamber 36 decreases slowly because its air is throttled across orifice 19 into lines 18 and 28.

At the same time, some air escapes from suppression chamber 14'a into chambers 35 and 34 through orifice 17. Because chamber 14'a has a relatively large volume Vb, the pressure in chamber 14'a does not decrease substantially.

When the pressure in delay chamber 36 drops to about 200 psi, the force on shuttle 12'a is downward. Then the airtightness between piston 61 and its seal 62 breaks. Pressure decreases in chamber 14'a and increases in chamber 35, resulting in a strong downward force on shuttle 12'a, which opens almost instantaneously because of its light weight. Shuttle 12'a is preferably made from a suitable light plastic material.

The air from chamber 14'a escapes through volumes 64, 35, 34, 14, and discharge ports 42. Shuttle 12'a is maintained in its open position by the pressure trapped inside chamber 37. In fact, air escapes very slowly from chamber 37 through line 65 and is throttled by orifice 43. But, the pressure in chamber 37 never drops below 1200 psi. When shuttle valve 12 in signal generator 10 seals off signal chamber 14, the pressurization of source A starts. Shuttle valve 12'a is at this time still open, so that air from chamber 14 flows out into channel 64 through line 16, and is throttle across orifice 17.

In the meantime, pressure increases in delay chamber 36 through passages 28, 18, and orifice 19. Air from chamber 37 continues to throttle across orifice 43 into chamber 14, as long as the pressure inside chamber 37 is greater than the pressure in chamber 14'a.

When the pressure in delay chamber 36 increases to about 1000 psi, shuttle 12'a moves up and its piston 61 is forced against its mating seal 62, which seals off chamber 14'a. At this time, suppression chamber 14'a is charged only through bore 16 and metering orifice 17. When the gas G2 in chamber 14'a is at about 1300 psi, air is throttled across orifice 43 and flows out through line 65 into chamber 37.

After about 5 seconds (for a 95 in³ chamber 14'a), all the air volumes are again pressurized to 2000 psi. Source A becomes ready for a new cycle.

II. Source B

Source B (FIGS. 12-19) includes a similar explsoive signal generator 10 as in source A, but a different explosive suppressor generator 10'b.

A deflector 15 removably couples them together. The cylindrical housing 73 of deflector 15 defines signal chamber 14 as well as four outlet ports 66 (FIGS. 12, 16), which preferably make a 60° angle with the vertical or longitudinal axis and preferably are angularly aligned with discharge ports 52. Signal chamber 14 of generator 10 is charged up from inlet line 22.

The explosive generator 10'b is more fully described in French Pat. No. 2,158,730. Housing 74 of generator 10'b defines a suppression chamber 14'b which is filled from inlet 22'. Valve 12'b slides on a piston 52 and is pneumatically operated through inlet lines 57 and 58 which are at different pressures. Inlet 47 supplies the triggering chamber 54 with 1000 psi, and inlet 58 supplies the return chamber 56 with 70 psi.

At the start, a pulse signal is sent on line 11 to solenoid 20 which allows valve 12 to open explosively. A delayed electric signal is then sent to solenoid valve 20' on line 11' inside conduit 58. The delay is 35 ms.

When activated, valve 12'b opens to allow air G2 from suppression chamber 14'b to become explosively released into bubble 1 through ports 66 of deflector 15.

Chamber 14 is repressurized after 60 ms, and chamber 14'b is repressurized after 1 second.

The optimum ratio Vb/Va is equal to about 2.1 and it can have a range between 1.8 and 2.6, where Vb is the volume of chamber 14'b, and Va is the volume of chamber 14.

Detailed Desciption Of One Operating Cycle

PHASE 1. Generator 10 Ready To Fire
Generator 10 (FIGS. 12, 13) and generator 10'b are armed.
Solenoid valves 20 and 21' are closed.
Shuttle valves 12 and 12'b seal off respectively signal chamber 14 and suppression chamber 14'b.
Source B is pressurized:
P14=P33=P32=P14'b=2000 psi.
P39=P55=Ph (hydrostatic pressure)=17 psi.
P56=70 psi.
P54=1000 psi.
Volumes:

$$Va = 14 + 33 = 45 \text{ in}^3.$$

$$Vb = 14'b = 95 \text{ in}^3.$$

PHASE 2. Generator 10 Exploded And $P_o$ Generated
At time t=0 (FIGS. 14, 14A).
Firing is initiated by energizing solenoid 20 of generator 10 with a short electric pulse on line 11.
Shuttle 12 moves up explosively to allow the compressed gas G1 from signal chamber 14 to discharge through ports 42 into the surrounding water.
This explosive air release generates the primary acoustic pulse $P_o$ on the pressure signature.
Bubble 1 is expanding (FIG. 3).

Figures 15, 16:
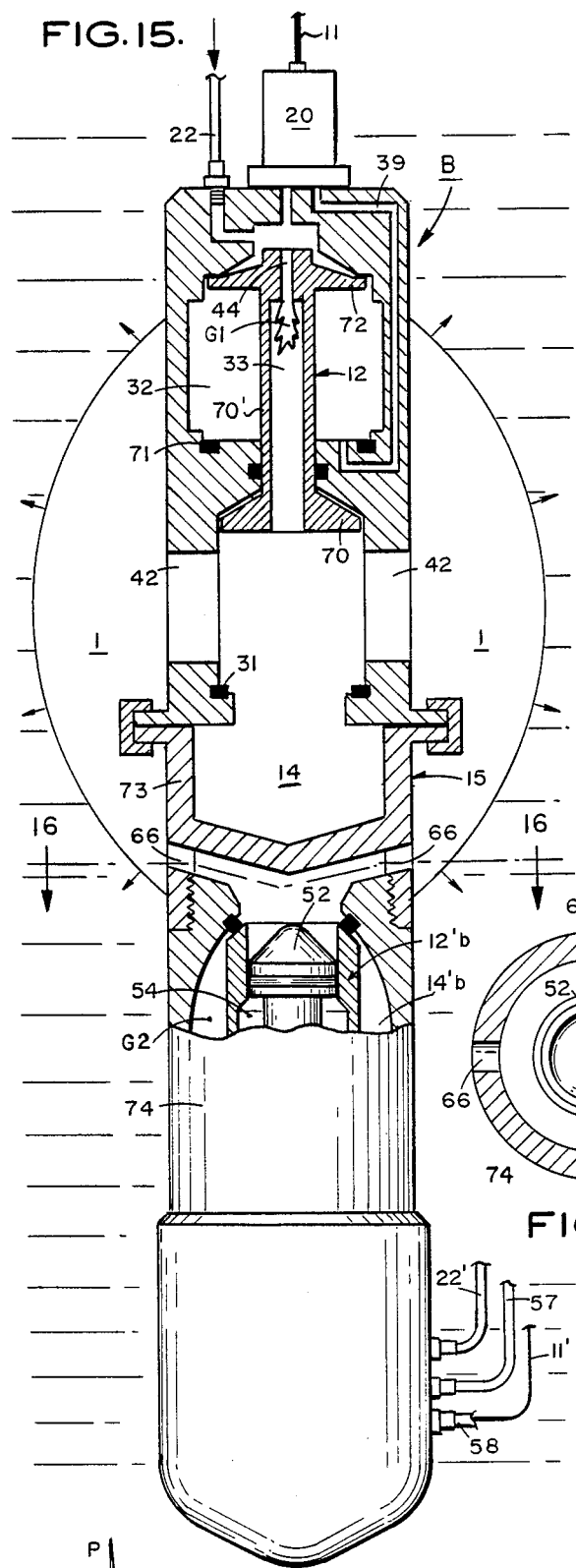
Figure 15A:
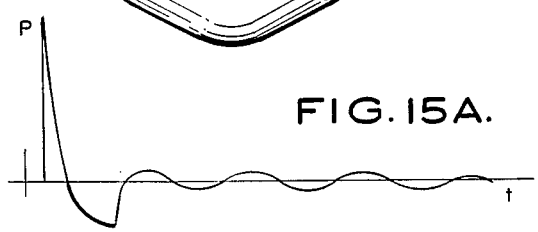

PHASE 3. Bubble 1 Is Close To Its Maximum Size
At t=30 ms (FIGS. 15, 15A).
Bubble 1 is close to its maximum size.
Pressure inside bubble 1 is much less than hydrostatic pressure; actually the bubble, at this instant, can be considered as a vacuum cavity.
A negative pulse P1 appears on the pressure signature.
Generator 10'b is still in stand-by.

Figure 17:
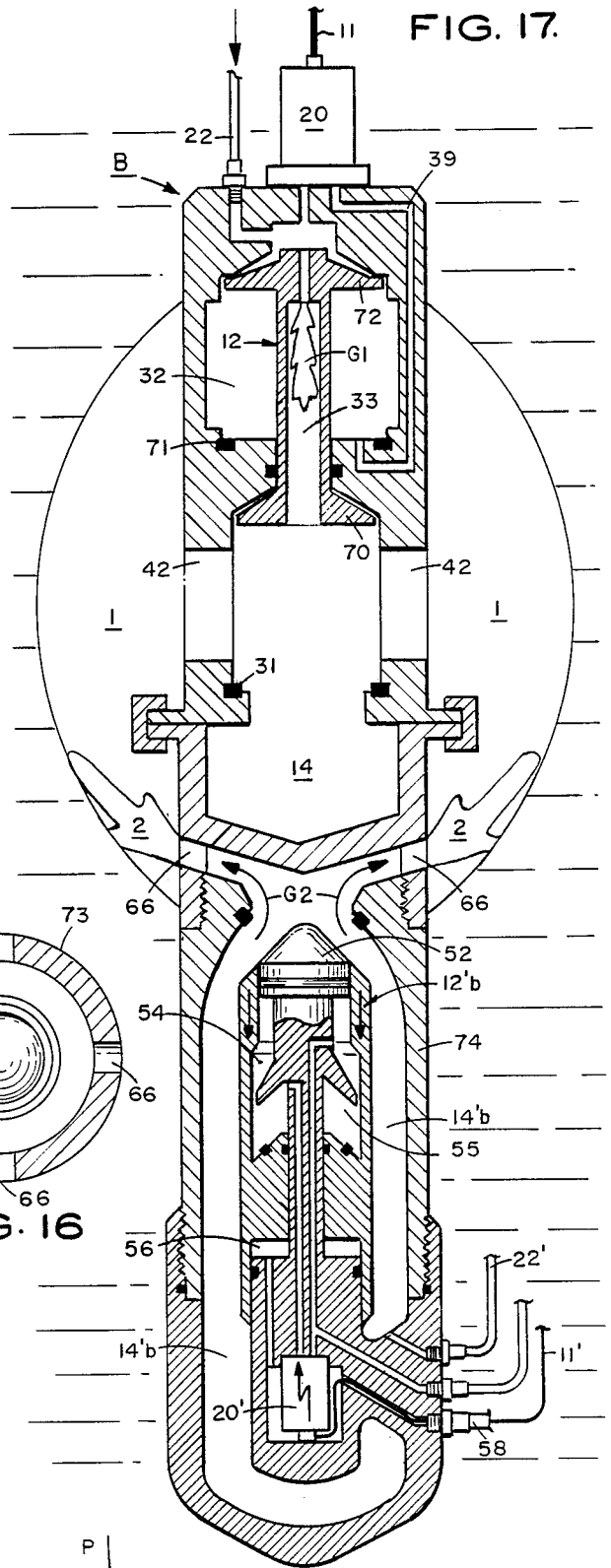
Figure 17A:
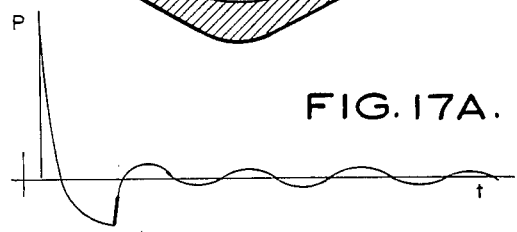
Figure 28:
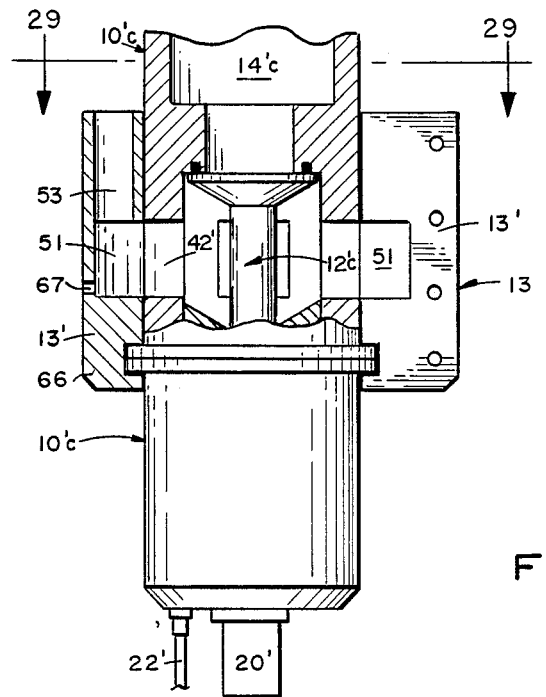
FIG. 28 is a view partly in section of one deflector embodiment used with the seismic energy source shown in FIG. 20.
Figure 29:
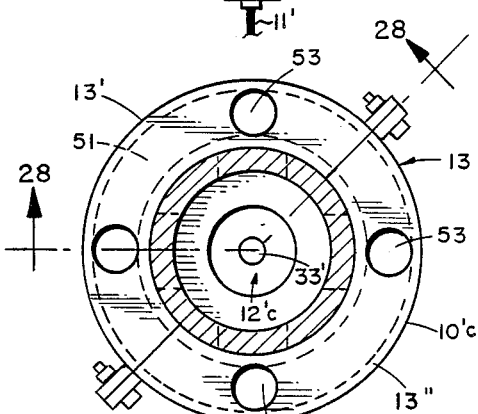
FIG. 29 is a view taken on line 29—29 in FIG. 28.
Figure 30:
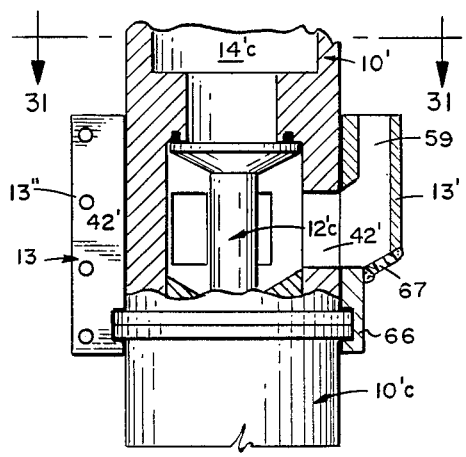
FIG. 30 is a view partly in section of a second deflector embodiment used with the seismic energy source shown in FIG. 20.
Figure 31:
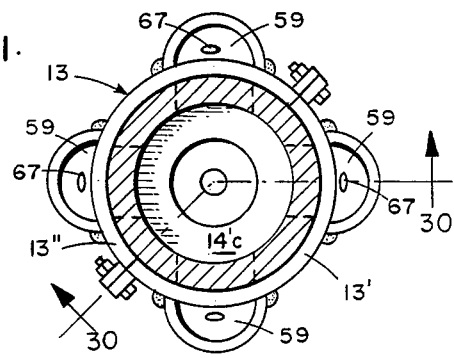
FIG. 31 is a view taken on line 31—31 in FIG. 30.

PHASE 4. Generator 10'b Explodes-Gas G2 Injected Into Bubble 1
At t=35 ms (FIGS. 16, 17, 17A).
After a delay of 35 ms, depending upon the volume Va of chamber 14, water depth, and/or firing air pressure in chamber 14'b, solenoid 20' is also energized via line 11'.

The gas G2 in triggering chamber 54 is sent to chamber 55 through solenoid valve 20'.

The force on shuttle 12'b reverses, causing it to explosively move downwardly.

The gas G2 from suppression chamber 14'b is explosively projected into bubble 1 through deflector ports 66 which are encompassed thereby.

The acoustic pressure signal shows an upward vertical step on the pressure signature.

PHASE 5. Hydrostatic Pressure Established Inside Bubble

At t=40 ms (FIGS. 18, 18A).

Vb is selected so that it can establish hydrostatic pressure inside bubble 1 at this time.

The amplitude of the acoustic signal is near zero.

Shuttle 12 of generator 10 moves downwardly and seals against ring 31, because of the 2000 psi pressure in return chamber 32.

PHASE 6. Bubble 1 Is Stabilized And Oscillates Gently Around Its Equilibrium Position The implosion of bubble 1 has been aborted.

Bubble 1 is stabilized and its boundary undergoes low amplitude oscillations (FIGS. 19, 19A) which generate a negligible low-amplitude acoustic signal.

Shuttle valve 12'b recocks becuase of the pressure in return chamber 56. Pressure in triggering chamber 54 is vented outside through a small orifice (not shown).

Source B is repressurized and made ready for another cycle.

III. Source C

Source C comprises an explosive signal generator 10 and an explosive suppressor generator 10'c which can be two PAR airguns such as described in U.S. Pat. No. 3,379,373. A gas deflector 13 is also provided.

If source C is operated at a low hydrostatic pressure, then bubble 1 will have a very large volume. On the other hand, if source C is submerged at greater depths, the volume of bubble 1 will be much smaller. In the shallow depths, the volume of bubble 1 can be so large that it will encompass the discharge ports 42' of explosive generator 10'c. One the other hand, in deeper waters, bubble 1 may not encompass ports 42' of explosive generator 10'c. When discharge ports 42' of explosive generator 10'c are not encompassed by bubble 1, bubble suppression may not be achieved.

Because bubble 1 sometimes may and sometimes may not encompass ports 42', I channel the discharged compressed air into bubble 1 through a deflector 13. This deflector 13 makes source C independent of depth variations.

Thus, deflector 13 has a double function: to act as a gas deflector, and to detachably couple suppressor generator 10'c to signal generator 10.

Bubble 1 produced by signal generator 10 is in fact not a sphere: it has four (4) well-known lobes (not shown). I have discovered that impulsively injecting a large quantity of gas G2 uniformly and simultaneously into the four lobes of bubble 1 is a critical operation. This can be accomplished with deflector 13 which injects the gas G2 into the individual lobes by directing each air jet into a corresponding lobe of bubble 1.

During the first cycle, a pulse signal on line 11 energizes solenoid 20 of explosive generator 10. Explosive shuttle valve 12 moves up and allows the pressure from signal chamber 14 to discharge explosively through ports 42 into the outside water to produce a primary pulse $P_o$.

A delayed second pulse is sent to solenoid 20' on line 11' which actuates explosive valve 12'c, causing air pressure from suppression chamber 14'c to discharge through the deflector's four outlet ports into their corresponding lobes of bubble 1.

After 60 ms, valve 12 closes, and signal chamber 14 starts to recharge from line 22.

Explosive valve 12'c closes after about 95 ms and then suppression chamber 14'c can again receive compressed air from line 22'.

Detailed Description Of One Operating Cycle

PHASE 1. Generator 10 Is Ready To Fire

Generator 10 (FIGS. 20, 22) and generator 10'c are armed.

Solenoid valves 20 and 20'c are closed.

Shuttles 12 and 12'c seal respectively signal chamber 14 and suppression chamber 14'c.

Source C is pressurized:

P32 = P14 = P14'c = P32' = 2000 psi.

Volumes:

$$Va = V14 = 45 \ in^3$$

$$Vb = V14'c = 95 \ in^3.$$

$$Vb/Va = 95/45 = 2.1.$$

PHASE 2. Generator 10 Exploded And $P_o$ Generated

At t=0 (FIGS. 23, 23A).

Firing of explosive generator 10 is initiated by energizing solenoid valve 20 with a short electric pulse on line 11.

Shuttle 12 moves up and allows the air from signal chamber 14 to explosively discharge through ports 42 into the surrounding water. Bubble 1 and pulse $P_o$ are generated. The geometry of bubble 1 is centered about ports 42 of explosive generator 10. Bubble 1 has four lobes: one lobe for each discharge port 42.

Bubble 1 is expanding (FIG. 3).

PHASE 3. Bubble 1 Is Close To Its Maximum Size

At t=30 ms (FIGS. 24, 24A).

Bubble 1 is clsoe to its maximum size.

Pressure inside bubble 1 is much less than hydrostatic pressure; actually bubble 1, at this instant, can be considered as a vacuum cavity.

A negative pressure pulse P1 appears on the pressure signature.

Generator 10'c is still in stand-by.

PHASE 4. Generator 10'c Injects Gas G2 Into Bubble 1

At t=35 ms (FIGS. 25, 25A).

Solenoid 20' of generator 10'c is energized by an electric pulse on line 11'.

The gas G2 contained in volume Vb of chamber 14'c is explosively injected into the vacuum cavity of bubble 1. The outlet ports of deflector 13 channel the discharged air from chamber 14'c toward corresponding lobes of bubble 1.

The acoustic pressure signal shows an upward vertical step.

PHASE 5. Hydrostatic Pressure Inside Bubble 1

At t=40 ms (FIGS. 3, 26, 26A).

Vb is selected so that it will establish hydrostatic pressure inside bubble 1. The amplitude of the acoustic signal is near zero (FIG. 26A). Shuttle valve 12 has moved to seal off its chamber 14.

PHASE 6. Bubble 1 Is Stabilized And Oscillates Gently Around Its Equilibrium Position The implosion of bubble 1 has been aborted.

Bubble 1 is stabilized (FIGS. 3, 27, 27A) and its boundary undergoes low-amplitude oscillations which generate a negligible low-amplitude, low-frequency acoustic wavelet.

Shuttle valve 12′c has moved to seal off its chamber 14′c.

Generator 10 and generator 10′c are again pressurized up to 2000 psi and made ready for another cycle.

Deflector Shapes

Figure 32:
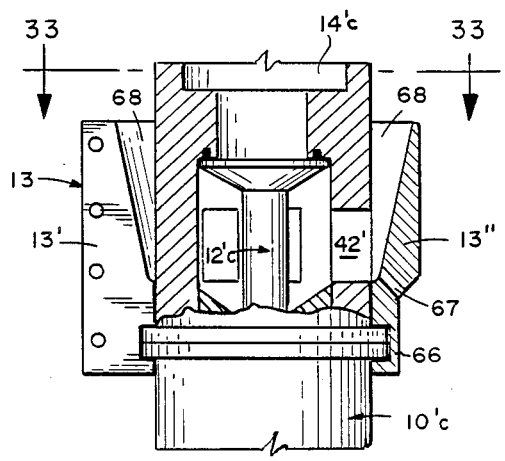
FIG. 32 is a view partly in section of a third deflector embodiment used with the seismic energy source shown in FIG. 20.
Figure 33:
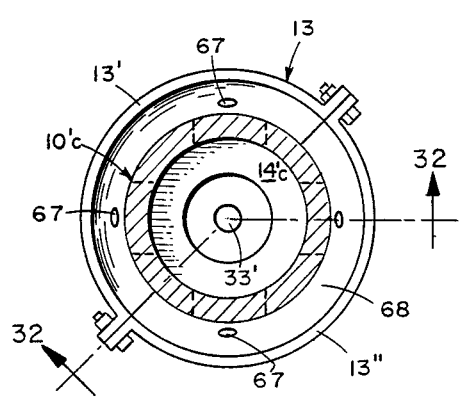
FIG. 33 is a view taken on line 33—33 in FIG. 32.

Deflector 13 can be made in different shapes (FIGS. 28–33). For example, it can be shaped to have four circular outlet ports 53 (FIGS. 28–29), or semi-circular ports 59 (FIGS. 30–31), or a single conical port 68 (FIGS. 32–33). An annular chamber 51 collects the air discharged by the four ports 42′ of generator 10′c.

Deflector 13 is preferably designed in two symmetrical parts 13′ and 13″ and is also provided with a clamp 66 to replace two pairs of half flanges, which conventionally serve to clamp upper and lower sub-assemblies of generator 10′c. The outlet ports 53, 59, and 58 are pointed in a direction so as to project the discharged gas G2 toward respective discharge ports 42 of signal generator 10. Each outlet port has a small orifice 67 (0.4 inch diameter) to prevent air from becoming trapped inside the port and to ensure that water damping will exist at the end of each stroke of shuttle 12′c.

Advantages

1. Extended Power Spectrum—Single Point Source

In addition to having advantages in the pressure-time domain, my novel acoustic source also has very important advantages in the power spectrum-frequency domain.

Figure 35:
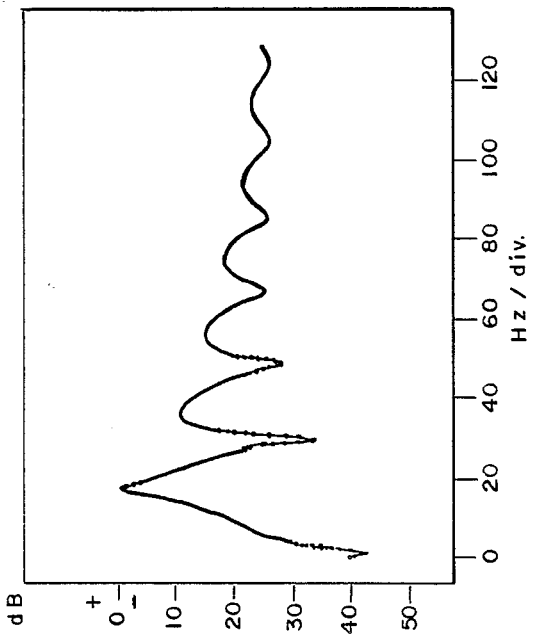
FIGS. 34 and 35 are pressure vs. time and power spectrum vs. frequency plots, respectively, of signal generator 10 operating alone.
Figure 37:
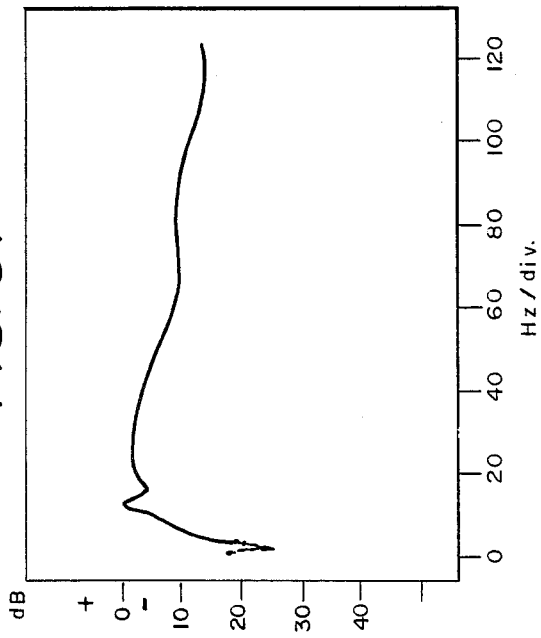
Figure 34:
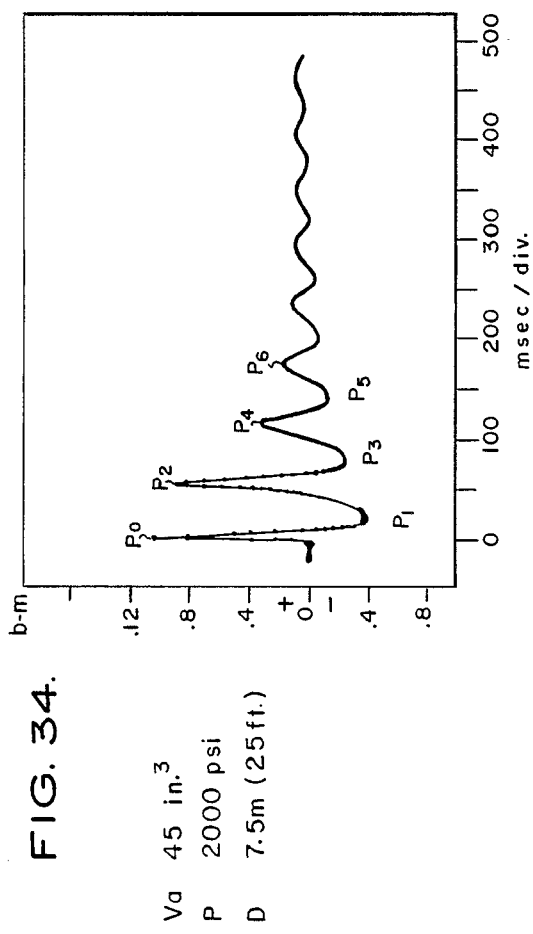
Figure 36:
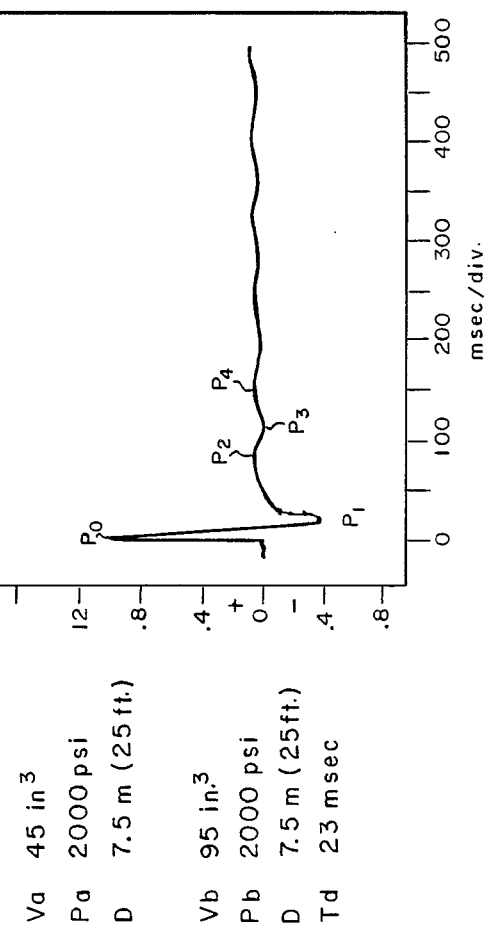
Figure 38:
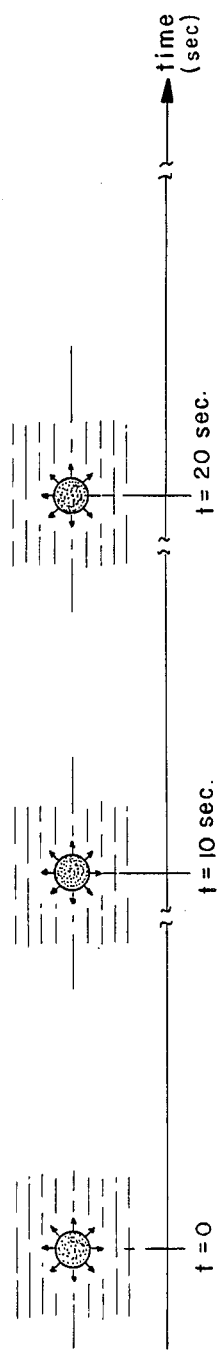
FIG. 38 illustrates consecutive explosions spaced 10 seconds apart and generated with generator 10 only.
Figure 39:
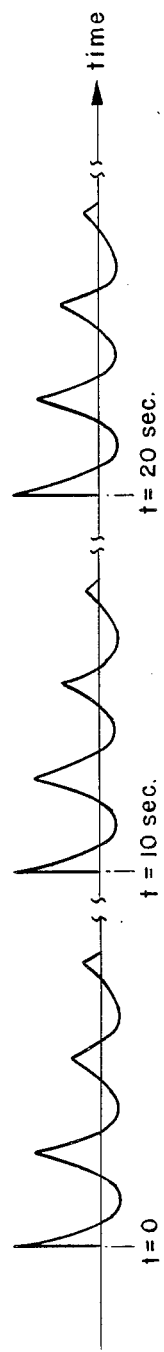
FIG. 39 shows consecutive pressure signatures obtained from the consecutive explosions shown in FIG. 38.
Figure 40:
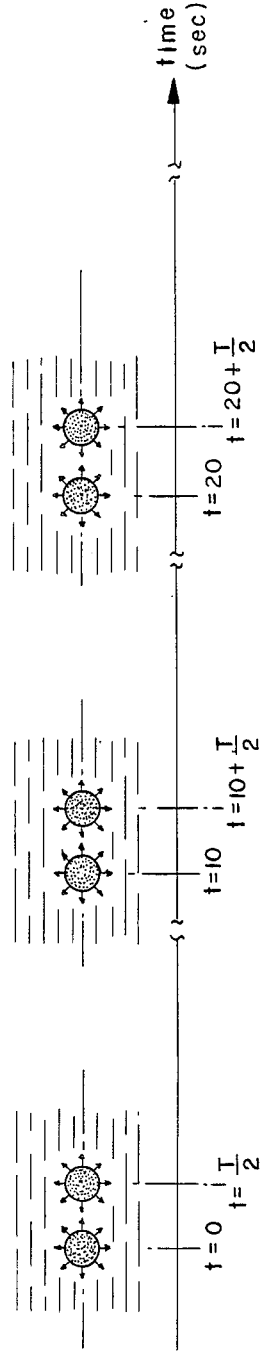
FIG. 40 illustrates consecutive double explosions also spaced 10 seconds apart but generated with generators 10 and 10'a following the method of this invention.
Figure 41:
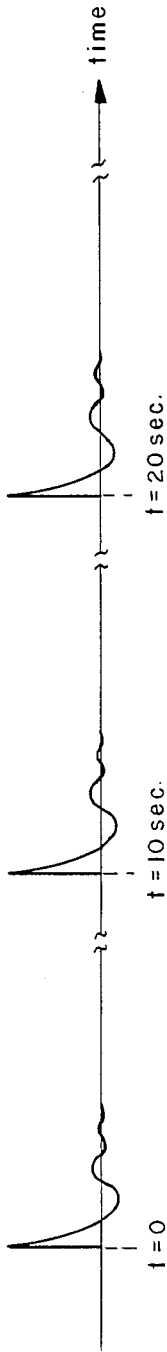
FIG. 41 shows consecutive pressure signatures obtained from the consecutive double explosions shown in FIG. 40.

By measuring the pressure signature with a detector positioned close to the source, for example one meter below the source, it is possible to construct a pressure-time signature for known generator 10 operating alone (FIG. 34) and for my source (A, B, or C) operating in conjunction with a suppressor generator 10′a, 10′b, or 10′c (FIG. 36), as well as their corresponding power spectra for generator 10 (FIG. 35) operating alone and for generators 10 and 10′ (FIG. 37) operating consecutively in accordance with this invention.

It will be observed from a detailed comparison of the pressure plots (FIGS. 34,36) and power spectra plots (FIGS. 35,37) that:

the uneven power spectrum (FIG. 35) for the known generator 10 is such that at some frequencies the amplitude of the spectrum is maximum, while for other frequencies, in the useful range, the amplitude of the spectrum is near zero;

the power spectrum (FIG. 37) for my acoustic source extends from 6 Hz to 125 Hz and is relatively smooth over the entire useful frequency range, resulting in better resolution and signal-to-noise ratio;

my acoustic source can be considered a point source because it produces a single, sharp, narrow-width pressure impulse $P_o$ and a relatively flat power spectrum curve which extends from 6 Hz to 125 Hz;

the high frequency content of my emitted single pressure impulse $P_0$ is very useful to the geophysicists for improving the discrimation of closely-spaced events and for providing better resolution at all depths;—the low-frequency content of my emitted impulse is extremely important to the geophysicists because the absorption of the earth varies with the exponential of the frequency, i.e., the lower the frequency the less the earth will absorb the seismic signals and the deeper the penetration will be; and the peak of the power spectrum of my source is positioned at a much lower frequency, as compared to the position of the peak of the power spectrum for the known generator 10 operating without my suppressor generator 10′. This shift in the position of the spectrum peak toward a lower frequency is also of great benefit to the geophysicists.

2. Arrays

Because they are not point source, conventional acoustic sources that generate secondary pulses have to be deployed in tuned arrays which utilize sources of different sizes in order to reduce the amplitudes of the individual bubble trains in the vertical and orthogonal planes. In other directions, and particularly the horizontal planes, such arrays detune, while in certain other directions the bubble energy will become additive.

In contrast, my single-point, high-energy source can be used alone or several identical sources can be used to construct a very efficient tapered array.

As distinguishejd from known sources which produce wavelets, no tuning and no bubble cancellations are required when an array is built using a number of my identically-sized acoustic sources.

The signature produced by my array will have the same shape as the pressure signature of the individual sources except for amplitude. There will be a linear summation of the individual impulse amplitudes (bar-meters), and the composite energy of the array will become proportional to $n^2$ where n is the number of my sources used.

Because the shapes of the pressure signature and of the power spectrum of my array produced by a plurality of my identical sources are the same as those of the individual sources forming the array, except for amplitude, if one source becomes inoperative in my array, no change will occur either in the shape of the pressure signature or in the shape of the power spectrum of the array, except for a change in amplitude.

Since the sharp impulses emitted by my sources are of minimum phase, processing of the gathered seismic data is greatly simplified.

Being able to use identical seismic sources of my design in order to construct a tapered array will greatly simplify their maintenance and will alleviate the inventory problem associated with carrying a wide range of spare parts on the seismic vessel.

Because the breakdown of a single conventional airgun in a conventional array will detune the array and cause a substantial change in the shape of the pressure signatures produced by the array, there is a need when using a conventional array to stop the seismic vessel, pull out the defective array from the water, replace the defective airgun or airguns, replace the array in the water, and then continue with the seismic survey, all of which is very costly to the user of the seismic vessel.

The loss of one or more of my acoustic sources in my array will not detune the array and the seismic survey can continue without stopping.

3. Practical Considerations

Thus, my acoustic impulse source can make use of conventional seismic generators such as airguns, and can be operated in conjunction with already existing seismic vessels, without requiring any major modifications thereto.

The cost of constructing and operating my novel energy sources is only a fraction of the corresponding costs involved in constructing and operating arrays using conventional inefficient seismic energy sources, or such systems as are described in the illustrative patents listed in the background section of this specification. The energy needed to operate my source 10 is relatively small compared to the energy consumed by the prior art arrays constructed from known sources.

Even when my source has to operate under conditions which are not optimum, bubble 1 will oscillate about a mean value and will generate secondary pulses but only of relatively low frequency and amplitude and, therefore, these are insignificant to the seismic record.

Thus, it will be appreciated that the objects set forth above have been accomplished, while other advantages and modifications will become apparent to those skilled in the art.

What I claim is:

1. A method of aborting the implosion by a body of water of a very low pressure region having a maximum volume $V_m$, comprising:

explosively releasing within said region a charge of a highly pressurized gas having sufficient energy to substantially establish hydrostatic pressure within said region, where the explosive release of said charge is started and the hydrostatic pressure is extablished within said region while the volume of said regions remains substantially within about 3% of said maximum volume, thereby substantially reducing said implosion of said region.

2. The method according to claim 1, wherein
prior to said explosive release, the volume of said region has a tendency to oscillate between maximum and minimum values; and
said maximum volume $V_m$ is the first maximum volume of said region.

3. The method according to claim 1, wherein
prior to said explosive release, the volume of said region oscillates between maximum and minimum values: and
said maximum volume $M_m$ is the second maximum volume of said region.

4. The method according to claim 1, wherein
said very low pressure region is produced by an explosive release of a highly pressurized gas within said body of water.

5. A method for generating within a body of water an impulsive acoustic signal, comprising:

explosively releasing within said body of water at a time $t=0$ a first charge of a highly pressurized gas, so as to produce in said water a powerful primary pressure pulse and a very low pressure region tending to oscillate at a period T and to generate secondary pressure pulses;
injecting within said region a second charge of a highly pressurized gas, said second charge having sufficient energy to substantially establish hydrostatic pressure within said region; and
where said injection of said second charge occurs and hydrostatic pressure is established within said region substantially between 0.4T and 0.6T.
thereby substantially reducing said secondary pressure pulses.

6. The method of claim 5 where said first charge has a volume $V_1$ and a pressure $P_1$, said second charge has a volume $V_2$ and a pressure $P_2$ and the ratio $P_2V_2/P_1V_1$ has a value substantially between 1.8 and 2.6 when P1 equals P2.

7. The method according to claim 5, wherein the duration of said injection of said second charge is substantially centered about 0.5T.

8. The method of claim 7, wherein said injection of said second charge occurs between 0.45T and 0.55T.

9. The method of claim 5, wherein said impulsive acoustic signal has a power spectrum flat substantially within 10dB over a frequency range of four octaves.

10. A repetitive acoustic source for generating within a body of water desired impulsive acoustic signals, comprising:

means for explosively releasing within said body of water at a time $t=0$ a first charge of a highly pressurized gas, so as to produce in said water a desired powerful primary pressure pulse and a very low pressure region, said region tending to oscillate at a period T and to produce undesired secondary pressure pulses;
means for injecting within said region a second charge of a highly pressurized gas, said second charge having sufficient energy to substantially establish hydrostatic pressure within the region, said injection of said second charge occurring and the hydrostatic pressure being established in the region substantially between 0.4T and 0.6T; and
means for periodically repeating said explosive release of said highly pressurized gas, and said injection of said highly pressurized gas.

11. The repetitive acoustic source of claim 10 wherein said first charge has a volume $V_1$ and pressure $P_1$, said second charge has a volume $V_2$ and a pressure $P_2$ and the ratio $P_2V_2/P_1V_1$ has a value substantially between 1.8 and 2.6 when P1 equals P2.

12. A repetitive marine acoustic source for generating within a body water impulsive acoustive signals, comprising:

A signal chamber having discharge port means into the water, said signal chamber containing a first charge of a highly pressurized gas;
a first fast-acting valve means normally maintaining said signal chamber closed;
an injection chamber having outlet means, said injection chamber containing a second charge of a highly pressurized gas;
a second fast-acting valve means normally maintaining said injection chamber closed;
control means for opening said first fast-acting valve means at a time $t=0$, so as to explosively discharge said first charge throught said signal chamber's port means into said water, thereby generating within said water a powerful primary pressure pulse and a very low pressure region, said low pressure region tending to oscillate at a period T and to produce in said water secondary pressure pulses;
said control means opening said second fast-acting valve means, thereby explosively releasing said second charge through said injection chamber's outlet means into said region, said second charge having sufficient energy to establish hydrostatic pressure within said region, said explosive release of said second charge occurring and hydrostatic pressure being established within said region substantially between 0.4T and 0.6T, thereby substantially reducing said secondary pressure pulses; and means for periodically repeating said explosive discharge and said explosive release.

13. The marine source according to claim 12, wherein said outlet means communicates directly with said water.

14. The marine source of claim 13, wherein said outlet means are encompassed by said region.

15. The marine source of claim 13, wherein said control means includes means for deflecting said released second charge through said outlet means toward and into said region.

16. The acoustic source according to claim 12, wherein said control means include pneumatic delay means.

17. The marine source according to claim 12, wherein said control means include electrical delay means.

18. The marine source according to claim 12, wherein
said outlet means establishes fluid communication between said injection chamber and said signal chamber; and
said first valve means and said second valve means, when opened by said control means, releasing said second charge from said injection chamber through said outlet means and into said signal chamber, and thence through said discharge port means and into said region.

19. A method of marine seismic exploration, comprising:
(a) explosively releasing within a body of water at a time $t=0$ a first charge of a highly pressurized gas, so as to produce in said water a powerful primary pressure pulse and a very low pressure region tending to oscillate at a period T, and said oscillations generating in said water secondary pressure pulses;
(b) explosively releasing within said region a second charge of a highly pressurized gas having sufficient energy to establish hydrostatic pressure within said region, said explosive release of said second charge occurring and hydrostatic pressure being established substantially between $0.4T$ and $0.6T$, thereby substantially reducing said secondary pressure pulses; and
(c) periodically repeating steps (a) and (b).

20. A method for generating within a body of water an impulsive acoustic signal, comprising:
generating within said water a very low pressure region having a first maximum volume, and allowing said water to freely implode said region and cause said region to undergo an oscillation cycle and reach a second maximum volume $V_m$;
explosively releasing within said region a charge of a highly pressurized gas having sufficient energy to substantially establish hydrostatic pressure within said second maximum volume of said region; and
said explosive release is started and hydrostatic pressure is established within said region while the volume of said region remains substantially within about 3% of its second maximum volume.

21. An explosive-type bubble-free acoustic apparatus for use in a body of water, said apparatus comprising:
a signal generator;
a bubble suppressor;
said generator and said suppressor each having a chamber for receiving highly pressurized gas, a discharge port, a movable shuttle valve for controlling said discharge port, and said suppressor's chamber being in fluid communication with said generator's chamber through said suppressor's discharge port;
said generator's shuttle valve having a main piston for opening and closing said generator's discharge port, a control piston for controlling the movements of said main piston, and a hollow shaft having an axial bore therethrough for maintaining said pistons in spaced relation;
a solenoid-operated valve for controlling the operation of said generator's valve;
said generator's chamber periodically receiving, in use, a first charge of highly pressurized gas, and said suppressor's chamber, in use, periodically receiving a second charge of highly pressurized gas;
said generator's shuttle valve being adapted to explosively release, at a time $t=0$, pressurized gas from its associated chamber through its discharge port and into the surrounding body of water, so as to periodically produce in said water a desired powerful primary pressure pulse and a bubble tending to oscillate at a period T, and said bubble oscillations producing undesirable secondary pressure pulses;
said shuttle valve of said bubble suppressor being adapted to release pressurized gas from said suppressor's chamber through its associated discharge port and into said generator's chamber, and thence through its associated discharge port into said bubble;
pneumatically-operated delay means for delaying the release of pressurized gas from said suppressor's chamber;
said pressurized gas from said suppressor having sufficient energy to substantially establish hydrostatic pressure within the bubble; and
said gas release from said suppressor's chamber into the bubble occurring and hydrostatic pressure being established substantially between $0.4T$ and $0.6T$, thereby substantially reducing said secondary pressure pulses.

22. An explosive-type, bubble-free acoustic apparatus for use in a body of water, said apparatus comprising:
a signal generator;
a bubble suppressor;
said generator and said suppressor each having a chamber for receiving a charge of highly pressurized gas, a discharge port into the water, a movable shuttle valve for controlling said discharge port, and a solenoid-operated valve for controlling the actuation of said shuttle valve;
each shuttle valve having a main piston for closing and opening its associated discharge port and for allowing its associated chamber to communicate directly with the outside medium, a control piston for controlling the movements of said main pistons, and a hollow shaft having an axial bore for maintaining said positions in spaced relation;
said generator's chamber periodically receiving, in use, a first charge of highly pressurized gas, and said suppressor's chamber, in use, periodically receiving a second charge of highly pressurized gas;
said generator's shuttle valve being adapted to explosively release, at a time $t=0$, pressurized gas from its associated chamber through its discharge port and into the surrounding body of water, so as to periodically produce in said water a desired powerful primary pressure pulse and a bubble tending to oscillate at a period T, and said bubble oscillations producing undesirable secondary pressure pulses;

said shuttle valve of said bubble suppressor being adapted to release pressurized gas from its associated chamber through the suppressor's discharge port and into said bubble;

electrical delay means for delaying the release of pressurized gas from said suppressor's chamber through its associated discharge port and into said bubble;

said pressurized gas from the suppressor having sufficient energy to substantially establish hydrostatic pressure within the bubble; and said gas release from said suppressor's chamber occurring and hydrostatic pressure being established within the bubble substantially between 0.4T and 0.6T, thereby substantially reducing said secondary pressure pulses.

23. The acoustic apparatus according to claim 22, wherein said bubble suppressor's discharge port is encompassed by said bubble.

24. The acoustic apparatus of claim 23, wherein said signal generator and said bubble suppressor are each elongate in shape and arranged such that the major axis of both the generator and the suppressor are in substantial alignment with each other.

25. The apparatus according to any one of claim 22, 23, and 24, and
a casing defining therein said signal generator's chamber and said suppressor's chamber.

26. The apparatus according to claim 22 wherein a deflector is coupled to said suppressor for deflecting the gas released from said suppressor's chamber and through said suppressor's discharge port into said bubble.

27. The apparatus of claim 26, wherein
said bubble has four lobes; and
said deflector has a chamber with four outlets for deflecting the gas released from said suppressor's discharge ports, and for directing the deflected gas toward respective lobes.

28. The apparatus according to claim 27, wherein
said deflector has two symmetrical parts; and
means for removably securing said parts to said suppressor.

29. The apparatus according to claim 27, and
a casing defining therein said signal generator's chamber and said suppressor's chamber.

30. The apparatus according to claim 26, wherein
said deflector has two symmetrical parts; and
means for removably securing said parts to said suppressor.

31. The apparatus according to claim 26, and
a casing defining therein said signal generator's chamber and said suppressor's chamber.

* * * * *

UNITED STATES PATENT AND TRADEMARK OFFICE
CERTIFICATE OF CORRECTION

PATENT NO. : 4,735,281
DATED : April 5, 1988
INVENTOR(S) : Adrien P. Pascouet Page 1 of 2

It is certified that error appears in the above-identified patent and that said Letters Patent are hereby corrected as shown below:

In the Specification

Column 2, line 49, "nostly" should read --mostly--.
Column 7, line 62, "way" should read --why--.
Column 8, line 68, "copletely" should read --completely--.
Column 10, line 37, "operation" should read --operation,--.
Column 11, line 25, "exploded" should read --Exploded--.
Column 11, line 36, "Shown in" should read --shown on--.
Column 11, line 39, "(FIGS. 3,3A)" should read --(FIGS. 8,8A)--.
Column 11, line 62, "(S2-S2)" should read --(S1-S2)--.
Column 13, line 67, "ports 52" should read --ports 42--.
Column 14, line 6, "Inlet 47" should read --Inlet 57--.
Column 14, line 27, "valves 20 and 21'" should read --valves 20 and 20'--.

UNITED STATES PATENT AND TRADEMARK OFFICE
CERTIFICATE OF CORRECTION

PATENT NO. : 4,735,281
DATED : April 5, 1988
INVENTOR(S) : Adrien P. Pascouet

Page 2 of 2

It is certified that error appears in the above-identified patent and that said Letters Patent are hereby corrected as shown below:

Column 15, line 26, "becuase" should read --because--.

Column 17, line 25, "ports 53, 59, and 58" should read --ports 53, 59, or 68--.

In the Claims

Column 19, line 30, "extablished" should read --established--.

Column 19, line 31, "regions" should read --region--.

Column 19, line 44, "$M_m$" should read --$V_m$--.

Column 20, line 52, "throught" should read --through--.

Column 22, line 56, "positions" should read --pistons--.

Claim 24 incorrectly depends from claim 23 instead of Claim 22.

Signed and Sealed this

Eleventh Day of October, 1988

Attest:

DONALD J. QUIGG

Attesting Officer

Commissioner of Patents and Trademarks